United States Patent
Kobayashi et al.

(10) Patent No.: US 8,912,739 B2
(45) Date of Patent: Dec. 16, 2014

(54) SYNCHRONOUS MACHINE CONTROL APPARATUS

(71) Applicant: Mitsubishi Electric Corporation, Chiyoda-ku, Tokyo (JP)

(72) Inventors: Takahiko Kobayashi, Chiyoda-ku (JP); Kiyoharu Anzai, Chiyoda-ku (JP); Noriyuki Wada, Chiyoda-ku (JP); Daiki Matsuura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 13/667,673

(22) Filed: Nov. 2, 2012

(65) Prior Publication Data
US 2013/0249448 A1    Sep. 26, 2013

(30) Foreign Application Priority Data

Mar. 22, 2012  (JP) ................................. 2012-064777

(51) Int. Cl.
*H02P 21/14* (2006.01)

(52) U.S. Cl.
USPC ...... 318/400.02; 318/471; 318/472; 318/700; 318/721; 318/801

(58) Field of Classification Search
CPC .......... H02P 21/00; H02P 27/04; H02P 29/00
USPC ............. 318/400.01, 400.02, 400.07, 400.14, 318/400.15, 721, 799, 800, 801, 432, 471, 318/472, 700; 324/765.01; 363/40, 55, 95
See application file for complete search history.

(56) References Cited

U.S. PATENT DOCUMENTS

| | | | |
|---|---|---|---|
| 6,933,701 B2 | 8/2005 | Kinpara et al. | |
| 7,554,281 B2 * | 6/2009 | Satake et al. | 318/432 |
| 8,242,722 B2 | 8/2012 | Matsui et al. | |
| 8,791,716 B2 * | 7/2014 | Tanimoto et al. | 324/765.01 |
| 2005/0024009 A1 | 2/2005 | Kinpara et al. | |
| 2008/0191656 A1 | 8/2008 | Satake et al. | |
| 2010/0109586 A1 | 5/2010 | Matsui et al. | |
| 2012/0001573 A1 | 1/2012 | Kimpara et al. | |

FOREIGN PATENT DOCUMENTS

| | | | |
|---|---|---|---|
| JP | 2003-235286 A | 8/2003 | |
| JP | 2006254521 A | 9/2006 | |
| JP | 2006254521 A * | 9/2006 | H02P 21/00 |
| JP | 2010-110141 A | 5/2010 | |

(Continued)

OTHER PUBLICATIONS

Japanese Office Action, issued Aug. 27, 2013, Patent Application No. 2012-064777.

*Primary Examiner* — Antony M Paul
(74) *Attorney, Agent, or Firm* — Sughrue Mion, PLLC; Richard C. Turner

(57) ABSTRACT

A synchronous machine control apparatus is characterized by including a magnet condition estimation unit (7, 7*a*) that estimates the temperature or the magnetic flux of a permanent magnet that forms the magnetic field of a synchronous machine (1), and is characterized in that the magnet condition estimation unit (7, 7*a*) coordinate-converts an armature current into currents on the γ-δ axis consisting of the γ axis and the δ axis that is perpendicular to the γ axis, based on the rotor position and the estimated γ axis, and estimates the temperature or the magnetic flux of the permanent magnet, based on the control command for the synchronous machine (1) and the γ-δ axis currents.

11 Claims, 17 Drawing Sheets

(56) References Cited

FOREIGN PATENT DOCUMENTS

| | | | |
|---|---|---|---|
| JP | 4548886 B2 | 7/2010 |
| JP | 4531751 B | 8/2010 |
| JP | 4672236 B2 | 1/2011 |
| JP | 4652176 B2 | 12/2011 |
| WO | 2010/109528 A1 | 9/2010 |

* cited by examiner (A) Tmag vs. Iγ CHARACTERISTIC (B) Tmag vs. Iδ CHARACTERISTIC (A) REFERENCE CONDITION (B) DEMAGNETIZATION KEEPING Id AND Iq CONSTANT DEMAGNETIZATION AMOUNT $\Delta \Phi_{mag}$ (A) REFERENCE CONDITION (B) DEMAGNETIZATION KEEPING Φ AND Iδ CONSTANT

● : CONTROL COMMAND CONDITION
　　FOR TEMPERATURE MEASUREMENT

▨ : SPEED ZONE FOR TEMPERATURE MEASUREMENT

SYNCHRONOUS MACHINE CONTROL APPARATUS

BACKGROUND OF THE INVENTION

1. Field of the Invention

The present invention relates to a synchronous machine control apparatus provided with an electric-power conversion unit that drives a synchronous machine.

2. Description of the Related Art

As is well known, in the case where a synchronous machine having a permanent magnet, as a magnet-field magnet, is controlled by a synchronous machine control apparatus having an electric-power conversion unit such as an inverter, a temperature rise due to energization of the armature of a synchronous machine or the like causes a so-called "demagnetization" phenomenon in which the intensity of magnetization of the magnetic-field permanent magnet, i.e., the magnetic flux is reduced; furthermore, when the allowable temperature is exceeded, a so-called "irreversible demagnetization" phenomenon is caused in which even when the temperature falls down to the normal temperature, the magnetic flux does not return to the state at a time before the demagnetization is caused.

Accordingly, it is required that when a synchronous machine having a permanent magnet as a magnetic-field magnet is controlled, at least the temperature of the permanent magnet is suppressed at a temperature lower than the allowable temperature at which irreversible demagnetization is caused. However, due to a space problem caused by the structure of the synchronous machine, a case protecting the outside of the synchronous machine, or the like, it is difficult to directly mount a temperature detection device on the permanent magnet; furthermore, most of synchronous machines having a permanent magnet as a magnetic-field magnet include the permanent magnet at a position that is inside the permanent magnet and in the vicinity of the rotor, resulting in a further large obstacle factor against mounting the temperature detection device. Accordingly, there is required a technology for indirectly measuring or estimating, with some sort of method, the temperature of the permanent magnet or the magnetic flux related to the temperature of the permanent magnet.

As an example of synchronous machine control apparatus that solves these problems, there exists a conventional apparatus (for example, refer to Patent Document 1) in which based on information items about the current, the temperature, and the rotation speed obtained from a current sensor that detects the current to be exchanged between the inverter and the armature winding, a temperature sensor that detects the temperature of the armature winding so as to correct the resistance value of the armature winding, and a magnetic pole position sensor that detects the magnetic pole position of the magnetic-field magnet, respectively, the value of the magnetic flux that departs from the magnetic-field permanent magnet and is interlinked with the armature winding is obtained by a magnetic flux observer consisting of a model of the synchronous machine (electric rotating machine) and a proportion integrator.

As another example of similar control apparatus, there exists a conventional apparatus (for example, refer to Patent Document 2) having a magnet temperature estimation unit in which when the armature winding (stator winding) is energized, map data corresponding to a battery inter-terminal voltage outputted from a voltage detector is firstly selected from respective map data items for two or more power source voltages stored in a reference magnetic-field current map, map data items corresponding to the torque detected by a torque sensor, the rotation speed outputted from an angle calculation unit, and the q-axis current (that denotes a magnetic-field current in the present invention, described later), among the respective map data items for two or more predetermined reference magnet temperatures included in the selected map data, are selected, and then the predetermined reference magnet temperature corresponding to the selected map data items is set as a magnet temperature estimation value.

As another example of similar control apparatus, there exists a conventional apparatus (for example, refer to Patent Document 3) in which based on the rotation speed of a synchronous machine, the basic wave current or the command value therefor, and the harmonic voltage command value having a frequency that is integral multiples as high as the basic wave frequency, the magnetic flux that is generated by the permanent magnet of the synchronous machine and is interlinked with the armature (armature-interlinked magnetic flux) is calculated, and with reference to a table for the permanent-magnet temperature vs. the armature-interlinked magnetic flux, the permanent-magnet temperature for the calculated value of the armature-interlinked magnetic flux is estimated.

Furthermore, as another example of similar control apparatus, there exists a conventional apparatus (for example, refer to Patent Document 4) having a voltage detector that detects the input voltage to a permanent-magnet-type synchronous motor, a voltage component converter that extracts the q-axis voltage from the output of the voltage detector, a rotation speed detector that detects the rotation speed, and a temperature estimation device that sets and stores the primary resistance of the permanent-magnet-type synchronous motor in a setting storage unit and that estimates a temperature change in the permanent-magnet-type synchronous motor, based on the d-axis current, the q-axis current, the q-axis voltage, the rotation speed, the primary resistance in the setting storage unit, and the magnetic flux.

Each of Patent Documents 5 and 6 discloses an example of technology in which based on a voltage command for a synchronous machine and an armature current, the rotation position of the synchronous machine is estimated through a calculation.

PRIOR ART REFERENCE

Patent Document

[Patent Document 1] Japanese Patent Application Laid-Open No. 2010-110141
[Patent Document 2] Japanese Patent No. 4652176
[Patent Document 3] Japanese Patent Application Laid-Open No. 2003-235286
[Patent Document 4] Japanese Patent No. 4548886
[Patent Document 5] Japanese Patent No. 4672236
[Patent Document 6] International Publication No. WO2010/109528

In the conventional apparatus disclosed in Patent Document 1, when the magnetic flux observer obtains the value of magnetic flux that departs from the magnetic-field permanent magnet and is interlinked with the armature winding, the resistance value of the armature winding, corrected based on the output of a temperature sensor that detects the temperature of the armature winding, is utilized; therefore, the temperature sensor for detecting the temperature of the armature winding is required, whereby there is posed a problem that the number of constituent components in the control apparatus certainly increases.

In the conventional apparatus disclosed in Patent Document 2, a great number of map data items for estimating the magnet temperature are created by measuring a great number of parameters including the torque, the rotation speed, and the power-source voltage, while the magnet temperature is changed; thus, there is posed a problem that a great deal of work is required for creating these map data items.

In the conventional apparatus disclosed in Patent Document 3, a harmonic current, which is originally not required for driving a synchronous machine and has a frequency that is integral multiples as high as the basic wave frequency of the basic wave component, is controlled; therefore, there is posed a problem that this harmonic current provides an effect to the controlling performance of the synchronous machine.

In the conventional apparatus disclosed in Patent Document 4, because in this method, a voltage component severely provides an effect, a voltage detector is required; thus, there is posed a problem that the number of constituent components in the control apparatus increases. Moreover, in Patent Document 4, it is stated that the input voltage to the synchronous machine is estimated; however, the detail of the estimation method has not been disclosed.

SUMMARY OF THE INVENTION

The present invention has been implemented in order to solve the foregoing problems in conventional synchronous machine control apparatuses; the objective thereof is to provide a synchronous machine control apparatus that can estimate with a high accuracy the temperature of a permanent magnet or the magnetic flux value while driving the synchronous machine having the magnetic-field permanent magnet, without any temperature detector being directly mounted on the permanent magnet.

A synchronous machine control apparatus according to the present invention includes an electric-power conversion unit that outputs a voltage to a synchronous machine 1 having a permanent magnet for forming a magnetic field, based on a voltage command; a current detection unit that detects an armature current of the synchronous machine; a voltage command calculation unit that calculates the voltage command, based on a control command; a position detection unit that estimates or detects a rotor position of the synchronous machine; a magnetic flux estimation device that estimates a γ axis in which a total armature-interlinked magnetic flux of the synchronous machine is generated, based on at least one of the armature current and the voltage command; and a magnet condition estimation unit that estimates the temperature or the magnetic flux of the permanent magnet.

The synchronous machine control apparatus according to the present invention is characterized in that the magnet condition estimation unit coordinate-converts the armature current into currents on the γ-δ axis consisting of the γ axis and a δ axis that is perpendicular to the γ axis, based on the rotor position and the estimated γ axis, and estimates the temperature or the magnetic flux of the permanent magnet, based on the control command and the γ-δ axis currents.

The synchronous machine control apparatus according to the present invention makes it possible to drive a synchronous machine while estimating with less map data a high-accuracy permanent-magnet temperature or magnetic flux that is insusceptible to the voltage output accuracy of the electric-power conversion unit, without mounting a temperature detection device directly on the permanent magnet.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
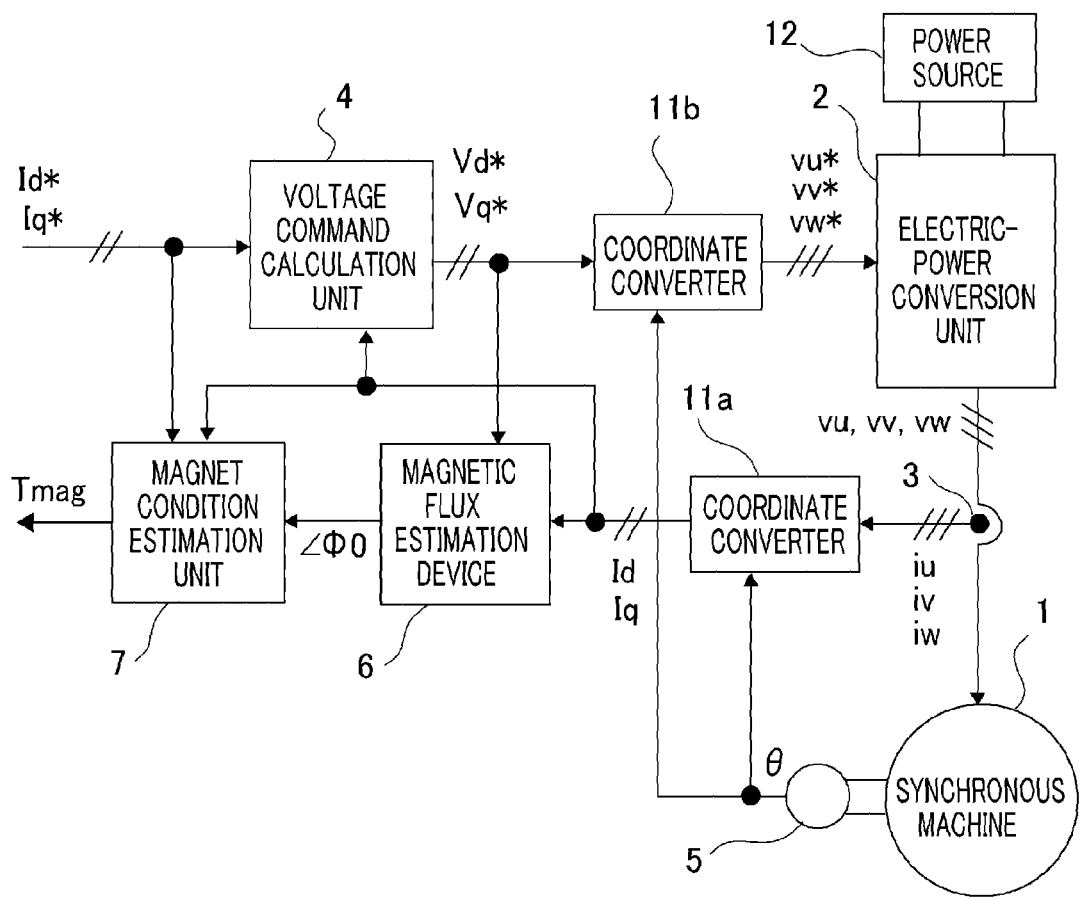
FIG. 1 is a system configuration diagram illustrating a synchronous machine control apparatus according to Embodiment 1 of the present invention, along with a synchronous machine.

Hereinafter, there will be explained the configuration of a synchronous machine control apparatus according to Embodiment 1 of the present invention and the functions of constituent elements. FIG. 1 is a system configuration diagram illustrating a synchronous machine control apparatus according to Embodiment 1 of the present invention, along with a synchronous machine. A synchronous machine 1 according to the present invention has a magnetic-field permanent magnet.

At first, with regard to the configuration, of a synchronous machine control apparatus according to Embodiment 1 of the present invention, that is required for driving a synchronous machine, there will be explained the flow from the output side of an electric-power conversion unit to the input side thereof where a voltage command is created. In FIG. 1, the synchronous machine 1 having a magnetic-field permanent magnet is controlled by a synchronous machine control apparatus according to Embodiment 1 of the present invention. The synchronous machine control apparatus is provided with an electric-power conversion unit 2 whose input and output are connected with a power source 12 and the armature winding of the synchronous machine 1, respectively, a current detection unit 3 that detects the armature current of the synchronous machine 1, a voltage command calculation unit 4, a position detection unit 5, a magnetic flux estimation device 6, a magnet condition estimation unit 7, a first coordinate converter 11a, and a second coordinate converter 11b.

The power source 12 is formed of a power supply unit or a battery that outputs a DC voltage. The concept of the power source 12 includes an apparatus that obtains a DC voltage from a single-phase or a three-phase AC power source by use of a well-known converter. The electric-power conversion unit 2 includes an inverter controlled through a well-known PWM (Pulse Width Modulation) method, converts DC electric power supplied from the power source 12 connected with the input thereof into multi-phase AC electric power, and then supplies the multi-phase AC electric power to the armature winding of the synchronous machine 1. Describing more in detail, the electric-power conversion unit 2 generates a multi-phase AC voltage based on a voltage command obtained from the voltage command calculation unit 4, described later, or to be exact, based on a multi-phase AC voltage command obtained by applying coordinate transformation to a voltage command outputted from the voltage command calculation unit 4, and applies the multi-phase AC voltage to the armature winding of the synchronous machine 1 so as to drive the synchronous machine 1. As a result, an output current is produced in the armature winding of the synchronous machine 1. Hereinafter, the output current produced in the armature winding will be expressed as an "armature current".

The armature current, which is the output current of the synchronous machine 1, is detected by the current detection unit 3 formed of a current sensor or the like. In the case where the synchronous machine 1 is a three-phase synchronous electric rotating machine, the current detection unit 3 may be configured in such a way that all of the armature currents of three phases, i.e., iu, iv, and iw of the synchronous machine 1 are detected; alternatively, the current detection unit 3 may be configured in such a way that the armature currents of two phases are detected so that the armature current of one phase, for example, the armature current of w-phase iw is obtained through the relationship [iw=−iu−iv] by use of the detected other armature currents of two phases iu and iv. The current detection unit 3 may be formed by use of a well-known technology in which the armature current is detected from a DC link current that flows from the power source 12 to the electric-power conversion unit 2, instead of being formed of a current sensor or the like that directly detects the armature current of each phase of the synchronous machine 1.

The position detection unit 5 is formed of a well-known resolver, encoder, or the like, and detects the position θ of the armature of the synchronous machine 1. Here, the position θ of the armature of the synchronous machine 1 denotes the N-pole-direction angle, of a permanent magnet that forms the magnetic field, with respect to an axis that is set by regarding the armature winding of u-phase as a reference; in general, the d axis of a rotating biaxial coordinate system (expressed as "d-q axis, hereinafter) that rotates at the rotation speed (electric angular frequency ω) of the synchronous machine 1 is set along the N-pole direction of the foregoing permanent magnet, and the q axis thereof is set along a perpendicular direction that is advanced from the d axis by 90°. This applies to the following explanation.

Figure 2:
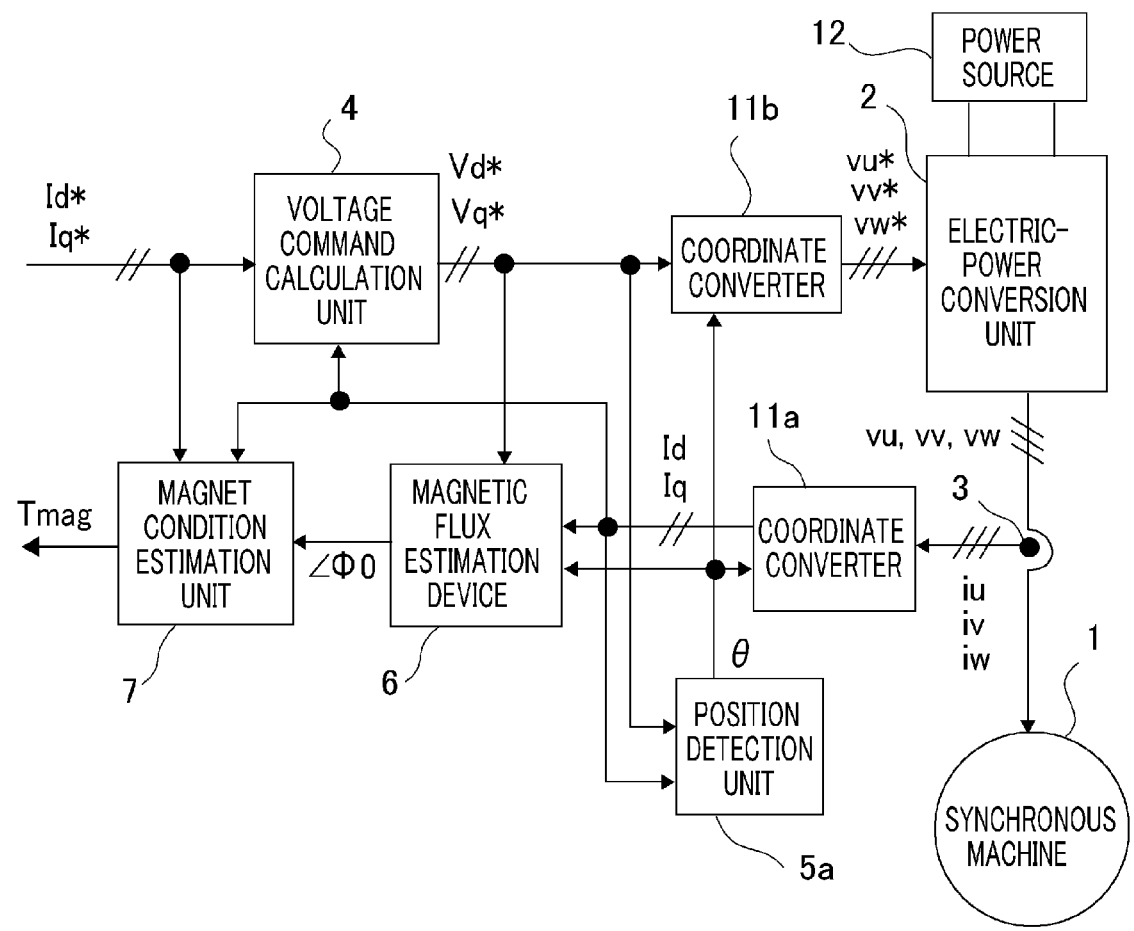
FIG. 2 is a system configuration diagram illustrating a variant example of synchronous machine control apparatus according to Embodiment 1 of the present invention, along with a synchronous machine.

FIG. 2 is a system configuration diagram illustrating a variant example of synchronous machine control apparatus according to Embodiment 1 of the present invention, along with a synchronous machine. The foregoing position detection unit 5 in FIG. 1 is utilized in the case where the position θ of the armature of the synchronous machine 1 is detected by use of a well-known resolver or encoder; however, a synchronous machine control apparatus illustrated in FIG. 2 is provided with a position detection unit 5a that utilizes a suitable well-known observer or the like and estimates the rotor position θ through a calculation, based on a voltage command, an armature current, and the like. The configuration of the position detection unit 5a can be implemented by the configuration described in Patent Document 5 or 6; therefore, the explanation therefor will be omitted in Embodiment 1. The difference between FIG. 1 and FIG. 2 lies on which one of the position detection units 5 and 5a is provided; the other configurations are identical to each other.

The coordinate converter 11a converts the armature currents iu, iv, and iw of the synchronous machine 1 into currents Id and Iq on the d-q axis through a calculation according to the equation (1) below, based on the rotor position θ.

$$\begin{pmatrix} Id \\ Iq \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (1)$$

The voltage command calculation unit 4 outputs voltage commands Vd* and Vq* on the d-q axis so as to make the currents Id and Iq on the d-q axis coincide with desired control commands (current commands Id* and Iq*, in Embodiment 1). In the case where current feedback control is performed, based on the respective differences between the current commands Id* and Iq* on the d-q axis and the currents Id and Iq on the d-q axis, the voltage command calculation unit 4 performs a proportional-integral control (PI control) according to the equation (2) below so as to create the voltage commands (current feedback control commands) Vd* and Vq* on the d-q axis.

$$\begin{cases} Vd^* = \left(Kpd + \frac{Kid}{s}\right)(Id^* - Id) \\ Vq^* = \left(Kpq + \frac{Kiq}{s}\right)(Iq^* - Iq) \end{cases} \quad (2)$$

where Kpd is a current control d-axis proportional gain, Kid is a current control d-axis integral gain, Kpq is a current control q-axis proportional gain, Kiq is a current control q-axis integral gain, and s is a Laplace operator. The reciprocal of the Laplace operator s denotes one-time time integration.

However, for example, in the case where as when high-speed drive is performed, the ratio of the carrier frequency of the electric-power conversion unit 2 such as a well-known PWM-control inverter to the rotation speed (electric angular frequency) ω of the synchronous machine 1 is small, i.e., when the number of switching actions by the switching device in the electric-power conversion unit 2 in one cycle of an AC voltage applied to each phase of the synchronous machine 1 becomes small, the voltage command required for making the current of the synchronous machine 1 follow a desired current command cannot be updated, whereby it becomes difficult to perform current feedback control. In such a case, it is only necessary to perform voltage feed-forward control. In order to perform the voltage feed-forward control, it is necessary to input the rotation speed ω, which is unillustrated, as the input of the voltage command calculation unit 4, in neither FIG. 1 nor FIG. 2, to the voltage command calculation unit 4. The rotation speed ω can be obtained by performing a differential operation by use of the rotor position θ detected by the position detection unit 5 or 5a.

In the case where voltage feed-forward control is performed, the voltage commands on the d-q axis (voltage feed-forward control commands) Vd* and Vq* are created through the equation (3) below, based on the current commands Id* and Iq* on the d-q axis, the rotation speed ω, and the permanent-magnet magnetic flux Φm.

$$\begin{cases} Vd^* = R \cdot Id^* - \omega \cdot Lq \cdot Iq^* \\ Vq^* = R \cdot Iq^* + \omega \cdot (Ld \cdot Id^* + \Phi m) \end{cases} \quad (3)$$

where Ld is the d-axis direction inductance (expressed as d-axis inductance, hereinafter), Lq is the q-axis direction inductance (expressed as q-axis inductance, hereinafter), and R is the resistance (consisting mainly of the resistance of the armature winding of the synchronous machine 1; however, in the case where the effect of the resistance of the wiring lead between the synchronous machine 1 and the electric-power conversion unit 2 is considerably large, the resistance of the wiring lead is also taken into consideration).

It may be allowed that at a time when drive is started, the permanent-magnet magnetic flux Φm in the equation (3) is set to a predetermined value such as a reference value and then is recursively and sequentially updated with a permanent-magnet magnetic flux estimation value Φmag, as a new Φm, that can be obtained by putting the synchronous machine control apparatus according to Embodiment 1 of the present invention into effect.

In the equation (3), all the d-q axis currents utilized in the calculation are Id* and Iq*; however, instead of these currents, the currents Id and Iq on the d-q axis, or the average value of Id* and Id and the average value of Iq* and Iq may be utilized.

It may be allowed that in the normal mode, only current feedback control is performed or both current feedback control and voltage feed-forward control are performed, and under a driving condition where current feedback control is difficult to perform, current feedback control is negated and only voltage feed-forward control is performed.

The voltage commands Vd* and Vq* on the d-q axis outputted from the voltage command calculation unit 4 are converted by the coordinate converter 11b into the voltage commands vu*, vv*, and vw*, through the equation (4) below and based on the rotor position θ, and are outputted to the electric-power conversion unit 2.

$$\begin{pmatrix} vu^* \\ vv^* \\ vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos\theta & -\sin\theta \\ \sin\theta & \cos\theta \end{pmatrix} \begin{pmatrix} Vd^* \\ Vq^* \end{pmatrix} \quad (4)$$

In this regard, however, it may be allowed that in the equation (4), considering the control calculation delay time (waste time) until the control calculation based on the armature currents iu, iv, and iw detected by the current detection unit 3 is reflected on the voltages vu, vv, and vw outputted from the electric-power conversion unit 2, the coordinate conversion is performed with a phase obtained by correcting the rotor position θ by a phase correction amount Δθd1 based on the control calculation delay time.

As described above, the electric-power conversion unit 2 applies the voltages vu, vv, vw to the synchronous machine 1 based on the voltage commands vu*, vv* and vw*, through a well-known PWM control method or the like.

What has been described heretofore is the configuration, of the synchronous machine control apparatus according to Embodiment 1 of the present invention, that is required for driving the synchronous machine 1. Next, there will be explained the magnetic flux estimation device 6 and the magnet condition estimation unit 7, which are the configurations, for estimating the temperature or the magnetic flux amount of the magnetic-field permanent magnet of the synchronous machine 1, that are features of the synchronous machine control apparatus according to Embodiment 1 of the present invention.

The magnetic flux estimation device 6 estimates the γ axis in which a total armature-interlinked magnetic flux Φ is produced, based at least the voltage commands Vd* and Vq* on the d-q axis; specifically, the magnetic flux estimation device 6 estimates the angle ∠Φ0 between the d axis and the direction of the estimated total armature-interlinked magnetic flux Φ. The total armature-interlinked magnetic flux Φ denotes the combined magnetic field of magnetic flux (referred to as permanent-magnet magnetic flux, hereinafter) Φm produced by the foregoing permanent magnet and magnetic flux (armature reaction magnetic flux) Φa produced by the foregoing armature current; in Embodiment 1 of the present invention, the direction that is perpendicular to (90° advanced from) the foregoing γ axis will be referred to as δ axis.

Figure 3:
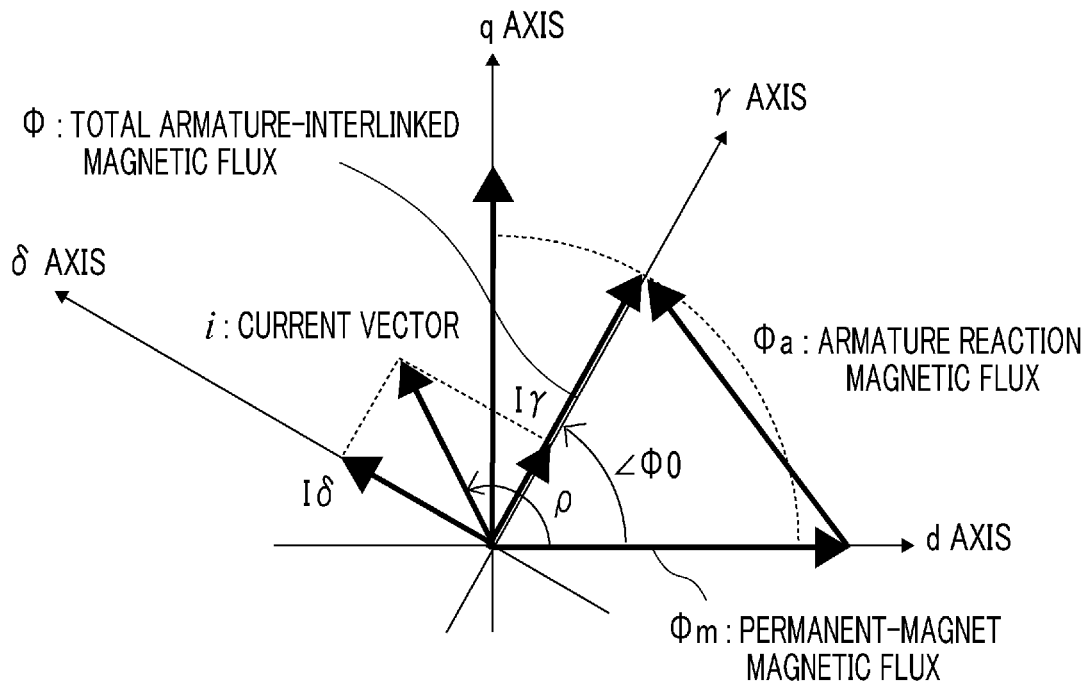
FIG. 3 is a vector chart of a synchronous machine having a magnetic-field permanent magnet.

FIG. 3 is a vector chart of a synchronous machine having a magnetic-field permanent magnet; the relationship between the γ-δ axis and the angle ∠Φ0 between the d axis and the direction of the total armature-interlinked magnetic flux Φ and the like are represented. As an optimum method for calculating the angle ∠Φ0, through the equation (5), which is a set of equations representing the relationship between the current Id on the d-q axis and the d-axis component Φd of the total armature-interlinked magnetic flux Φ and the relationship between the current Iq on the d-q axis and the q-axis component Φq of the total armature-interlinked magnetic flux Φ, Φd and Φq are obtained, and then the angle ∠Φ0 is calculated from the obtained Φd and Φq, based on the equation (6) below.

$$\begin{cases} \Phi d = Ld \cdot Id + \Phi m \\ \Phi q = Lq \cdot Iq \end{cases} \tag{5}$$

$$\angle \Phi 0 = \tan^{-1}\left(\frac{\Phi q}{\Phi d}\right) \tag{6}$$

It is known that due to the magnetic saturation, the values of the d-q axis inductances Ld and Lq utilized in the calculation based on the equation (5) change depending on the armature current; it may be allowed that for example, the relationships between the current Id on the d-q axis and the d-q axis inductance Ld and the relationships between the current Iq on the d-q axis and the d-q axis inductance Lq are stored as equations or in a table and are changed in accordance with the current so that the error in estimating the magnetic flux due to the change in the inductance can be reduced.

The permanent-magnet magnetic flux Φm changes as the temperature changes; thus, at a time when drive is started, the permanent-magnet magnetic flux Φm is set to a predetermined value such as a reference value and then is recursively and sequentially updated with a permanent-magnet magnetic flux estimation value Φmag, as a new Φm, that can be obtained by putting the synchronous machine control apparatus according to Embodiment 1 of the present invention into effect.

As another optimum method for calculating the angle ∠Φ0, through the equation (7), which is a set of equations representing the relationship between the voltage Vd on the d-q axis and the d-axis component Φd of the total armature-interlinked magnetic flux Φ and the relationship between the voltage Vq on the d-q axis and the q-axis component Φq of the total armature-interlinked magnetic flux Φ, Φd and Φq are obtained, and then the angle ∠Φ0 is calculated from the obtained Φd and Φq, based on the foregoing equation (6).

$$\begin{cases} \Phi d = \frac{1}{\omega}\{Vq - (R + Lq \cdot s)Iq\} \cong \frac{1}{\omega}\{Vq^* - R \cdot Iq\} \\ \Phi q = \frac{1}{\omega}\{Vd - (R + Ld \cdot s)Id\} \cong \frac{1}{\omega}\{Vq^* - R \cdot Iq\} \end{cases} \tag{7}$$

However, in each of the configurations in FIGS. 1 and 2 of Embodiment 1 of the present invention, the values of the voltage Vd, and Vq on the d-q axis are unknown; thus, instead of the voltage Vd, and Vq on the d-q axis, the voltage commands Vd* and Vq* on the d-q axis are utilized. In this situation, at a time when the drive of the synchronous machine 1 is started, the voltage commands Vd* and Vq* on the d-q axis are "0" and hence Φd and Φq are "0"; therefore, the initial value of the d-axis component Φd of the total armature-interlinked magnetic flux Φ at a time when the drive of the synchronous machine 1 is started is set to a predetermined permanent-magnet magnetic flux Φm such as a reference value.

It is necessary to input the rotation speed ω, which is unillustrated, as the input of the voltage command calculation unit 6, in neither FIG. 1 nor FIG. 2, to the voltage command calculation unit 6; therefore, the rotation speed ω is obtained by performing a differential operation by use of the rotor position θ detected by the position detection unit 5 or 5a. In the equation (7), it may be allowed that assuming that the current changes gradually, the term including the Laplace operator s is neglected.

As far as the resistance R is concerned, because the resistance value changes depending on the temperature of the synchronous machine 1, it may be allowed to correct the value of the resistance R by detecting the temperature of the synchronous machine 1; furthermore, in the case where the terms related to the resistance R are smaller than the other terms, it may be allowed that the terms including the resistance R are neglected and information on the armature current of the synchronous machine 1 is not utilized in the calculation of the angle ∠Φ0 so that the calculation is simplified.

Figure 4:
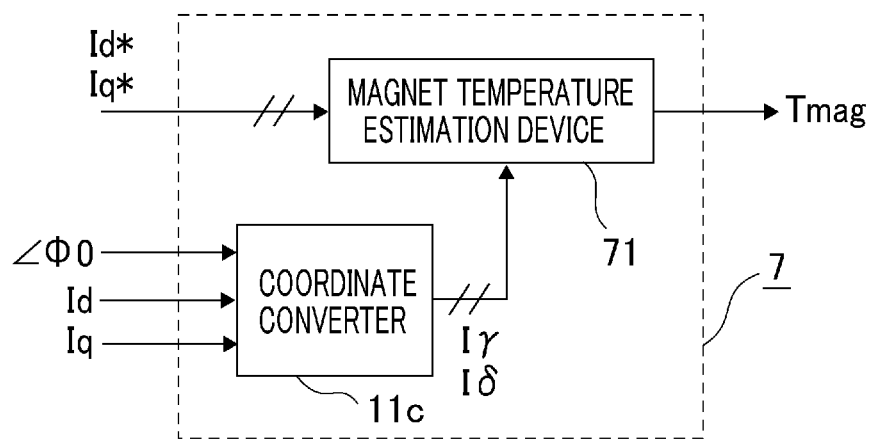
FIG. 4 is a block diagram illustrating an example of configuration of a magnet condition estimation unit in a synchronous machine control apparatus according to Embodiment 1 of the present invention.

FIG. 4 is a system configuration diagram illustrating an example of configuration of a magnet condition estimation unit in a synchronous machine control apparatus according to Embodiment 1 of the present invention. As illustrated in FIG. 4, the magnet condition estimation unit 7, which is one of the features of the synchronous machine control apparatus according to Embodiment 1 of the present invention, is configured with a coordinate converter 11c and a magnet temperature estimation device 71 and outputs a permanent magnet temperature estimation value Tmag based on currents Iγ and Iδ on the γ-δ axis, when predetermined control commands (in Embodiment 1, predetermined d-q axis current commands Id* and Iq*) are given thereto.

In accordance with the equation (8) below, the coordinate converter 11c converts the armature currents Id and Iq on the d-q axis into the currents Iγ and Iδ on the γ-δ axis, based on the angle ∠Φ0 obtained by the magnetic flux estimation device 6. It may be allowed that instead of the currents Id and Iq on the d-q axis, the current commands Id* and Iq* on the d-q axis are converted into the currents Iγ and Iδ on the γ-δ axis.

$$\begin{pmatrix} I\gamma \\ I\delta \end{pmatrix} = \begin{pmatrix} \cos(\angle\Phi 0) & \sin(\angle\Phi 0) \\ -\sin(\angle\Phi 0) & \cos(\angle\Phi 0) \end{pmatrix} \begin{pmatrix} Id \\ Iq \end{pmatrix} \quad (8)$$

The γ-axis current Iγ and the δ-axis current Iδ obtained through the conversion based on the equation (8) correspond to the magnetization current for operating the total armature-interlinked magnetic flux Φ of the synchronous machine 1 and to the torque current that contributes to production of the torque of the synchronous machine 1, respectively.

The magnet temperature estimation device 71 preliminarily stores a map or an equation indicating the relationship between the currents Iγ and Iδ on the γ-δ axis and the permanent-magnet temperature (estimation value) Tmag, which is caused by a temperature change at a time when predetermined d-q axis current commands Id* and Iq* are given; when Iγ or Iδ is inputted thereto, the magnet temperature estimation device 71 refers to the map or the equation and outputs the permanent-magnet temperature estimation value Tmag. The foregoing map or equation is preliminarily obtained by use of characteristic data on the synchronous machine 1, when the characteristics (such as an inductance change and a magnetic demagnetization characteristic) of the synchronous machine 1 are known through an analysis or the like; when not known, it is only necessary to obtain the characteristic data through an actual measurement.

Figure 5:
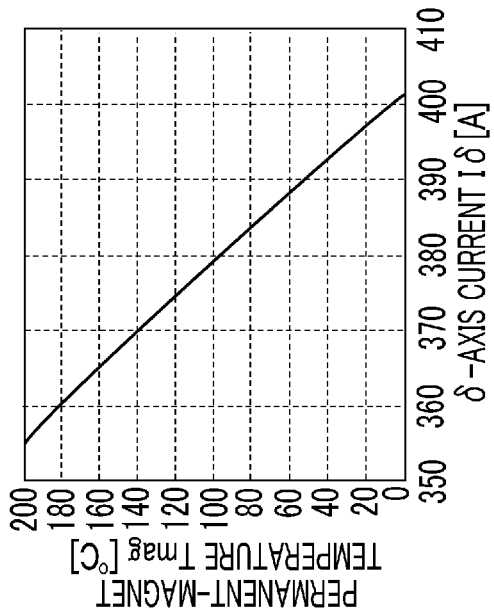
FIG. 5 is a set of characteristic graphs for explaining the relationship between the temperature of a permanent magnet and the current Iγ or Iδ on the γ-δ axis under a predetermined d-q axis current command condition.
Figure 5:
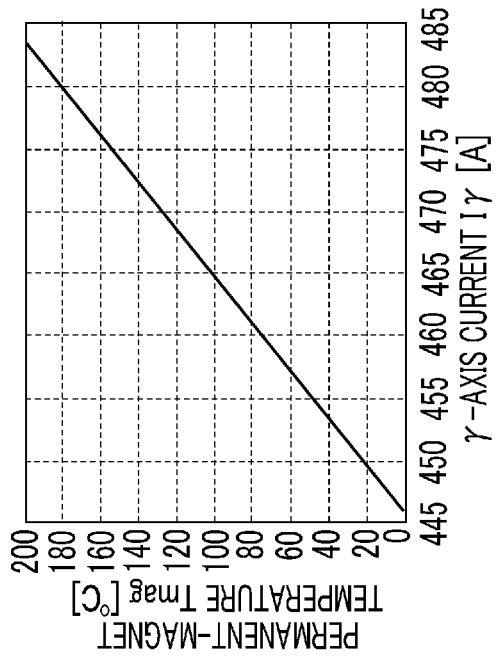

FIG. 5 is a set of characteristic graphs for explaining the relationship between the permanent-magnet temperature and the current Iγ or Iδ on the γ-δ axis under a predetermined d-q axis current command condition; there is represented an example of the relationship between the permanent-magnet temperature and the current Iγ or Iδ on the γ-δ axis under a predetermined d-q axis current command condition (for example, Id*:0 [A], Iq*:600 [A]). FIG. 5(A), in which the abscissa denotes the γ-axis current Iγ and the ordinate denotes the permanent-magnet temperature (estimation value) Tmag, represents the characteristic of the permanent-magnet temperature Tmag vs. the γ-axis current Iγ. FIG. 5(B), in which the abscissa denotes the δ-axis current Iδ and the ordinate denotes the permanent-magnet temperature (estimation value) Tmag, represents the characteristic of the permanent-magnet temperature Tmag vs. the δ-axis current Iδ.

In the case where there exists at least one of FIGS. 5(A) and 5(B), the permanent-magnet temperature Tmag can be estimated by setting the d-q axis current commands, for example, Id* to 0 [A] and Iq* to 600 [A] and driving the synchronous machine 1.

In the configuration illustrated in FIG. 4, the output of the magnet condition estimation unit 7 is the permanent-magnet temperature estimation value Tmag; however, because there exists a correlation between the permanent-magnet temperature estimation value Tmag and the permanent-magnet magnetic flux estimation value Φmag, the output of the magnet condition estimation unit 7 can be replaced by the permanent-magnet magnetic flux estimation value Φmag, by preliminarily obtaining the correlation. For example, in the case of a permanent magnet in which 1% of demagnetization is caused as the temperature rises by 10° C., the relationship between the permanent-magnet temperature estimation value Tmag and the permanent-magnet magnetic flux estimation value Φmag is given by the equation (9) below, letting T0 and Φm0 denote a reference temperature and the permanent-magnet magnetic flux at a time when the temperature is T0, respectively.

$$\Phi\text{mag}=\Phi\text{m0}\cdot\{T\text{mag}-T0)\cdot 0.001\} \quad (9)$$

Figure 6:
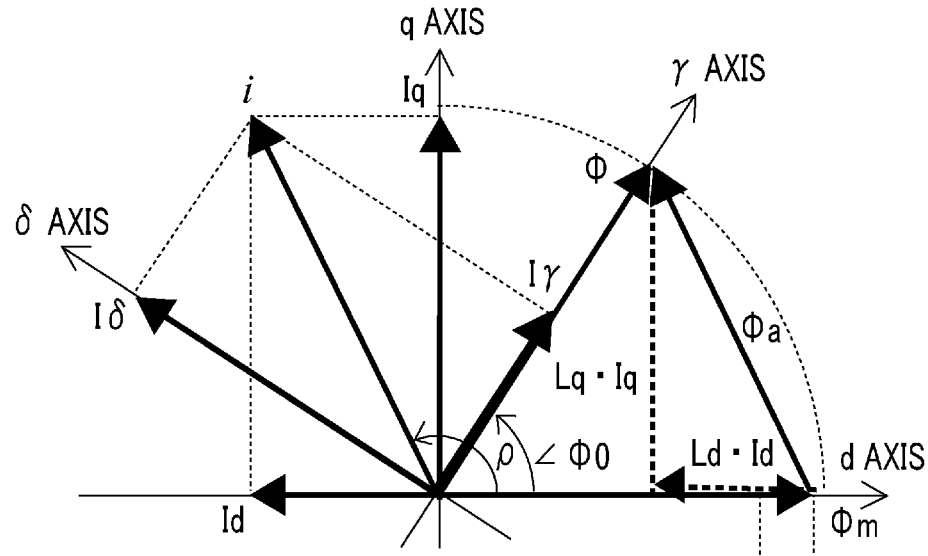
FIG. 6 is a set of explanatory charts representing the difference between a vector chart at the reference condition and a vector chart at a time when demagnetization is caused under a given condition of the d-q axis current command, in a vector chart of a synchronous machine having a magnetic-field permanent magnet.
Figure 6:
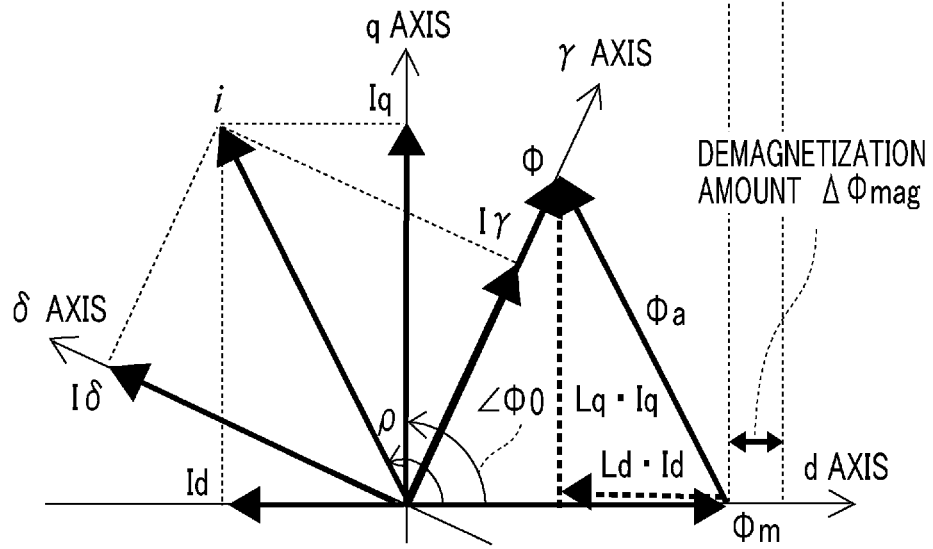

Next, there will be explained the principle in which when predetermined d-q axis current commands Id* and Iq* are given, the permanent-magnet temperature Tmag is estimated based on the current Iγ or Iδ on the γ-δ axis. FIG. 6 is a set of explanatory charts representing the difference between a vector chart at the reference condition and a vector chart at a time when demagnetization is caused under a given condition of the d-q axis current command, in a vector chart of a synchronous machine having a magnetic-field permanent magnet; FIG. 6(A) is a vector chart at a time when the permanent magnet is in the reference condition, i.e., no demagnetization is caused in the permanent magnet; FIG. 6(B) is a vector chart at a time when FIG. 6(A) is utilized as a reference, the permanent magnet is in a steady state where control commands, i.e., the predetermined d-q axis current commands Id* and Iq* in Embodiment 1, are constant (under the assumption that the desired control is being performed, the d-q axis currents Id and Iq are also constant), and demagnetization (decrease in the magnetic flux corresponding to ΔΦmag) of the permanent magnet is caused due to a temperature rise in the synchronous machine 1.

As represented in FIG. 5, demagnetization changes the direction of the total armature-interlinked magnetic flux Φ, i.e., the direction of the γ-axis; therefore, in the case where coordinate conversion is applied to the d-q axis currents Id and Iq, there occurs a change between the pre-demagnetization γ-δ axis currents Iγ and Iδ and the post-demagnetization γ-δ axis currents Iγ and Iδ, even when the d-q axis currents Id and Iq are kept constant; thus, by grasping the change in the γ-δ axis currents Iγ and Iδ, a change in the permanent-magnet magnetic flux Φmag, i.e., a change in the permanent-magnet temperature Tmag can also be grasped.

In the foregoing synchronous machine control apparatus according to Embodiment 1 of the present invention, it is not required to mount a temperature detector directly on the permanent magnet, and the permanent-magnet temperature (or magnetic flux) of the synchronous machine 1 is estimated based on not voltage information but the γ-δ axis currents Iγ and Iδ; therefore, the voltage-output accuracy (e.g., a voltage error caused by the dead time of the inverter) of the electric-power conversion unit 2 hardly provides an adverse effect, whereby there is demonstrated an effect that the temperature or the magnetic flux of the permanent magnet can accurately be estimated.

When there exists at least one kind of map data, these values can be estimated; thus, there is demonstrated an effect that the permanent-magnet temperature or magnetic flux can be estimated with less map data.

Embodiment 2

Figure 7:
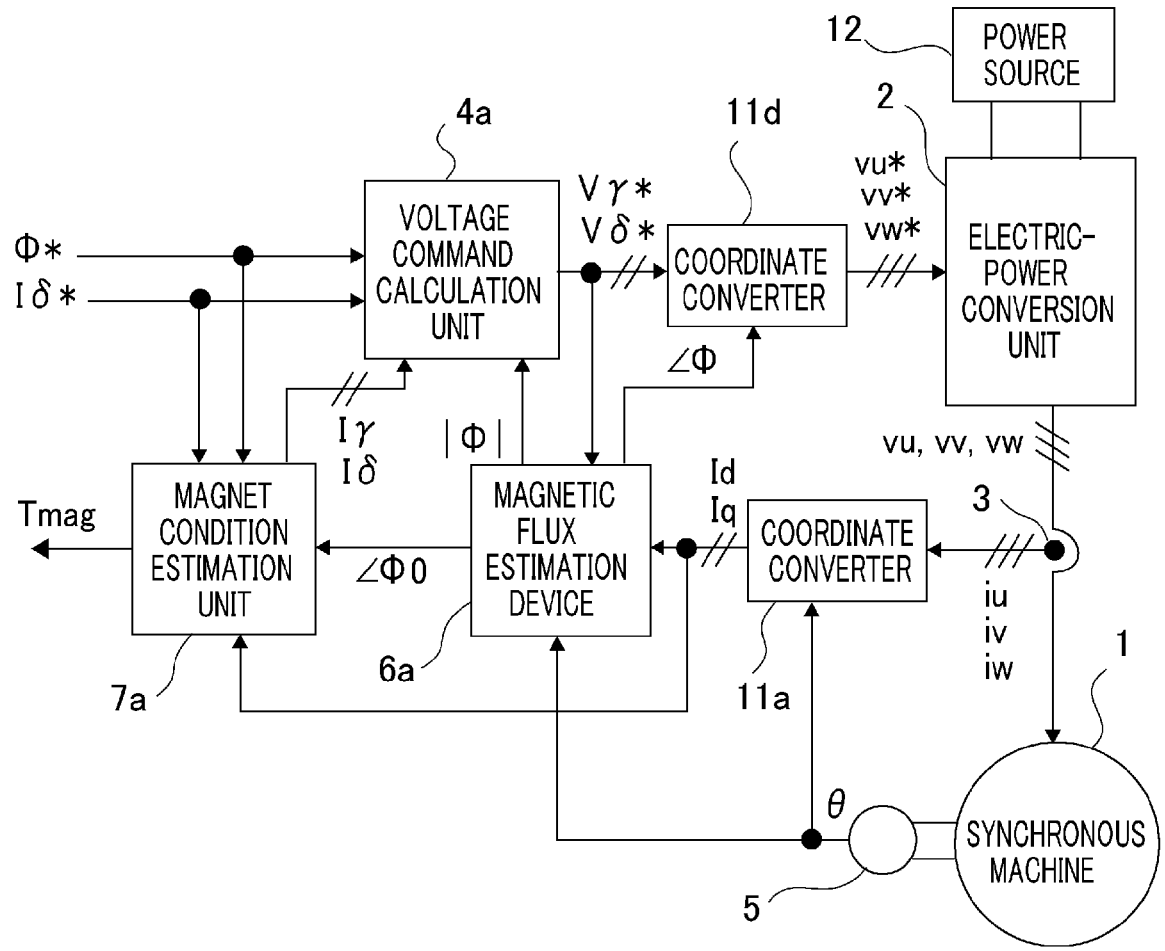
FIG. 7 is a system configuration diagram illustrating a synchronous machine control apparatus according to Embodiment 2 of the present invention, along with a synchronous machine.

Next, there will be explained a synchronous machine control apparatus according to Embodiment 2 of the present invention. FIG. 7 is a system configuration diagram illustrating a synchronous machine control apparatus according to Embodiment 2 of the present invention, along with a synchronous machine. In Embodiment 1, as the control commands, the d-q axis current commands Id* and Iq* are given; however, in Embodiment 2, as the control commands, the total armature-interlinked magnetic flux command Φ* and the δ-axis current command Iδ* are given. Although not illustrated in particular, there may be adopted, also in Embodiment 2, a configuration in which as illustrated in FIG. 2, there is provided the position detection unit 5 that obtains the rotor position θ through an estimation calculation.

Hereinafter, the parts different from those in Embodiment 1 will be mainly explained; the explanation for the same parts as those in Embodiment 1 will appropriately be omitted. At first, with regard to a configuration required for driving the synchronous machine 1 in Embodiment 2, there will be explained the flow from the processing in which the armature currents iu, iv, and iw of the synchronous machine 1 are converted into the currents Id and Iq on the d-q axis through a calculation according to the equation (1), based on the rotor position θ, to the creation of a voltage command inputted to the electric-power conversion unit 2.

In FIG. 7, the magnetic flux estimation device 6a estimates the angle ∠Φ0 between the d axis and the direction of the estimated total armature-interlinked magnetic flux Φ, described in Embodiment 1, and obtains the angle ∠Φ (hereinafter, expressed as the phase of the total armature-interlinked magnetic flux Φ) between the direction of the estimated total armature-interlinked magnetic flux Φ and an axis established by taking the magnitude |Φ| of the total armature-interlinked magnetic flux Φ and the u-phase armature winding as references. Specifically, through the method described in Embodiment 1, the d-axis component Φd and the q-axis component Φq of the total armature-interlinked magnetic flux Φ are estimated, and then the magnitude |Φ| and the phase ∠Φ of the total armature-interlinked magnetic flux Φ are obtained based on the equations (10) and (11).

$$|\Phi| = \sqrt{\Phi d^2 + \Phi q^2} \tag{10}$$

$$\angle\Phi = \tan^{-1}\left(\frac{\Phi q}{\Phi d}\right) + \theta = \angle\Phi 0 + \theta \tag{11}$$

Figure 8:
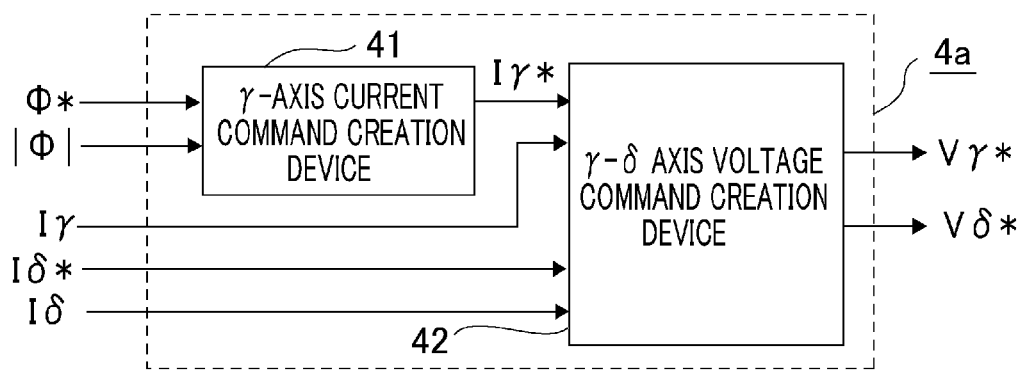
FIG. 8 is a system diagram illustrating an example of configuration of a voltage command calculation unit in a synchronous machine control apparatus according to Embodiment 2 of the present invention.

FIG. 8 is a system diagram illustrating an example of configuration of a voltage command calculation unit in a synchronous machine control apparatus according to Embodiment 2 of the present invention. As illustrated in FIG. 8, the voltage command calculation unit 4a is configured with a γ-axis current command creation device 41 and a γ-δ axis voltage command creation device 42, and outputs γ-δ axis voltage commands Vγ* and Vδ* in such a way that the total armature-interlinked magnetic flux (and the δ-axis current Iδ coincide with desired control commands, i.e., the total armature-interlinked magnetic flux command Φ* and δ-axis current command Iδ*, respectively.

Based on a magnetic-flux error ΔΦ, the γ-axis current command creation device 41 creates a γ-axis current command Iγ* in such a way that the total armature-interlinked magnetic flux error ΔΦ is adjusted to be zero. The magnetic-flux error ΔΦ is calculated by subtracting the magnitude |Φ| of the total armature-interlinked magnetic flux Φ, which has been obtained through the equation (10), from the total armature-interlinked magnetic flux command Φ*; the equation (12) below is the arithmetic expression therefor.

$$\Delta\Phi = \Phi^* - |\Phi| \tag{12}$$

Because the γ-axis current Iγ is a magnetization current, which is the magnetization component for the synchronous machine 1, the total armature-interlinked magnetic flux can be operated by the γ-axis current. Specifically, the increase/decrease amount of the magnetization current and the increase/decrease amount of the total armature-interlinked magnetic flux are in proportion to each other with the γ-axis direction inductance Lγ as the proportionality coefficient; as the controller for adjusting the magnetic-flux error ΔΦ to be zero, for example, an integrator is suitable.

For that reason, the γ-axis current command Iγ* is created by use of an integration control calculation represented by the equation (13) below.

$$I\gamma^* = \frac{Kf \cdot \Delta\Phi}{s} \tag{13}$$

where Kf is an integration gain.

The γ-δ axis voltage commands Vγ* and Vδ* are outputted in such a way that the γ-δ axis currents Iγ and Iδ coincide with the current commands Iγ* and Iδ*, respectively. As is the case with Embodiment 1, the γ-δ axis currents Iγ and Iδ are obtained by a magnet condition estimation unit 7a, described later. In the case where current feedback control is performed, based on the respective differences between the current commands Iγ* and Iδ* on the γ-δ axis and the currents Iγ and Iδ on the γ-δ axis, a proportional-integral control (PI control) according to the equation (14) below is performed so as to create the voltage commands (current feedback control commands) Vγ* and Vδ* on the γ-δ axis.

$$\begin{cases} V\gamma^* = \left(Kp\gamma + \frac{Ki\gamma}{s}\right)(I\gamma^* - I\gamma) \\ V\delta^* = \left(Kp\delta + \frac{Ki\delta}{s}\right)(I\delta^* - I\delta) \end{cases} \tag{14}$$

where Kpγ is a current control γ-axis proportional gain, Kiγ is a current control γ-axis integral gain, Kpδ is a current control δ-axis proportional gain, and Kiδ is a current control δ-axis integral gain.

In the case where it is difficult to perform current feedback control, voltage feed-forward control may be performed, as is the case with Embodiment 1. In this regard, however, in order to perform voltage feed-forward control, it is required to input the rotation speed ω and the amplitude |Φ| of the armature-interlinked magnetic flux, which are not illustrated as the inputs of the voltage command calculation unit 4 in FIG. 7, to the voltage command calculation unit 4; thus, as described above, the rotation speed ω is preliminarily obtained by performing a differential operation based on the rotor position θ.

In the case where voltage feed-forward control is performed, the voltage commands on the γ-δ axis (voltage feed-forward control commands) Vγ* and Vδ* are created through the equation (15) below, based on the current commands Iγ* and Iδ* on the γ-δ axis, the rotation speed ω, and the amplitude |Φ| of the armature-interlinked magnetic flux.

$$\begin{cases} V\gamma^* = R \cdot I\gamma^* \\ V\delta^* = R \cdot I\delta^* + \omega|\Phi| \end{cases} \tag{15}$$

In the equation (15), all the γ-δ axis currents utilized in the calculation are Iγ* and Iδ*; however, instead of these currents, the currents Iγ and Iδ on the γ-δ axis, or the average value of Iγ* and Iγ and the average value of Iδ* and Iδ may be utilized. It may be allowed that in the normal mode, only current feedback control is performed or both current feedback control and voltage feed-forward control are performed, and under a driving condition where current feedback control is difficult to perform, current feedback control is negated and only voltage feed-forward control is performed.

The voltage commands Vγ* and Vδ on the γ-δ axis outputted from the voltage command calculation unit 4a are converted by the coordinate converter 11d into the voltage commands vu*, vv*, and vw*, through the equation (16) below and based on the phase ∠Φ, of the total armature-interlinked magnetic flux Φ, that has been estimated by the magnetic flux estimation device 6a, and are outputted to the electric-power conversion unit 2.

$$\begin{pmatrix} vu^* \\ vv^* \\ vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\angle\Phi) & -\sin(\angle\Phi) \\ \sin(\angle\Phi) & \cos(\angle\Phi) \end{pmatrix} \begin{pmatrix} V\gamma^* \\ V\delta^* \end{pmatrix} \quad (16)$$

$$= \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\angle\Phi 0 + \theta) & -\sin(\angle\Phi 0 + \theta) \\ \sin(\angle\Phi 0 + \theta) & \cos(\angle\Phi 0 + \theta) \end{pmatrix} \begin{pmatrix} V\gamma^* \\ V\delta^* \end{pmatrix}$$

In this regard, however, it may be allowed that in the equation (16), considering the control calculation delay time (waste time) until the control calculation based on the armature currents iu, iv, and iw detected by the current detection unit 3 is reflected on the voltages vu, vv, and vw outputted from the electric-power conversion unit 2, the coordinate conversion is performed with a phase obtained by correcting the rotor position θ by a phase correction amount Δθd2 based on the control calculation delay time.

As is the case with Embodiment 1, the electric-power conversion unit 2 applies the voltages vu, vv, vw to the synchronous machine 1 based on the voltage commands vu*, vv* and vw*, through a well-known PWM control method or the like.

Figure 9:
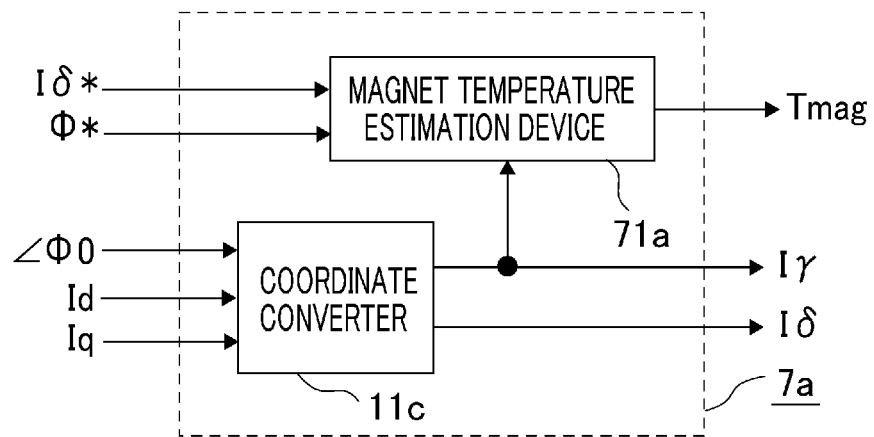
FIG. 9 is a block diagram illustrating an example of configuration of a magnet condition estimation unit in a synchronous machine control apparatus according to Embodiment 2 of the present invention.

Next, there will be explained the magnet condition estimation unit 7a, which is a configuration required for estimating the temperature or the magnetic flux amount of the permanent magnet. FIG. 9 is a configuration diagram illustrating an example of configuration of a magnet condition estimation unit in a synchronous machine control apparatus according to Embodiment 2 of the present invention. In FIG. 9, the magnet condition estimation unit 7a is configured with the coordinate converter 11c and the magnet temperature estimation device 71a and outputs the permanent-magnet temperature estimation value Tmag based on the γ-axis current Iγ, when predetermined control commands (in Embodiment 2, the total armature-interlinked magnetic flux command Φ* and the δ-axis current command Iδ*) are given thereto.

In accordance with the equation (8), the coordinate converter 11c converts the currents Id and Iq on the d-q axis into the currents Iγ and Iδ on the γ-δ axis, based on the angle ∠Φ0 obtained by the magnetic flux estimation device 6a. The values of the currents Iγ and Iδ on the γ-δ axis, created by the coordinate converter 11c, are utilized also in the voltage command calculation unit 4a.

The magnet temperature estimation device 71a preliminarily stores a map or an equation indicating the relationship between the γ-axis current Iγ and the permanent-magnet temperature (estimation value) Tmag, which is caused by a temperature change at a time when predetermined total armature-interlinked magnetic flux command Φ* and the δ-axis current command Iδ* are given; when the γ-axis Iγ is inputted thereto, the magnet temperature estimation device 71a refers to the map or the equation and outputs the permanent-magnet temperature estimation value Tmag. As is the case with Embodiment 1, the foregoing map or equation is preliminarily obtained by use of characteristic data on the synchronous machine 1, when the characteristics (such as an inductance change and a magnetic demagnetization characteristic) of the synchronous machine 1 are known through an analysis or the like; when not known, it is only necessary to obtain the characteristic data through an actual measurement. Instead of the γ-axis current Iγ to be inputted to the magnet temperature estimation device 71a, the current command Iγ* outputted from the γ-axis current command creation device 41 may be utilized.

Figure 10:
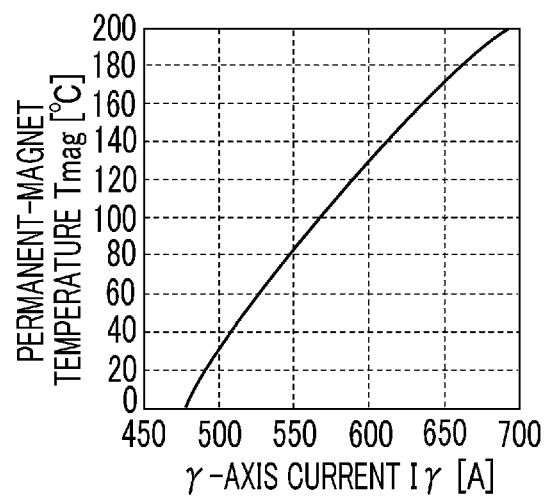
FIG. 10 is a characteristic graph for explaining the relationship between the temperature of a permanent magnet and the γ-axis current Iγ at predetermined conditions of the total armature-interlinked magnetic flux command Φ* and the δ-axis current command Iδ*.

FIG. 10 is a characteristic graph for explaining the relationship between the permanent-magnet temperature Tmag and the γ-axis current Iγ at predetermined conditions of the total armature-interlinked magnetic flux command Φ* and the δ-axis current command Iδ*; as an example, there is represented the relationship between the permanent-magnet temperature Tmag and the γ-axis current Iγ under the condition that the total armature-interlinked magnetic flux command Φ* and the δ-axis current command Iδ* are set to 0.08 [Wb] and 450 [A], respectively. FIG. 10(A), in which the abscissa denotes the γ-axis current Iγ and the ordinate denotes the permanent-magnet temperature (estimation value) Tmag, represents the characteristic of the permanent-magnet temperature (estimation value) Tmag vs. the γ-axis current Iγ.

As represented in FIG. 10, for example, by setting the total armature-interlinked magnetic flux command Φ* and the δ-axis current command Iδ* to set to 0.08 [Wb] and 450 [A], respectively, so as to drive the synchronous machine 1, the permanent-magnet temperature Tmag can be estimated based on the γ-axis current Iγ. In the configuration illustrated in FIG. 9, the output of the magnet condition estimation unit 7a is the permanent-magnet temperature estimation value Tmag; however, because as described above, there exists a correlation between the permanent-magnet temperature estimation value Tmag and the permanent-magnet magnetic flux estimation value Φmag, the output of the magnet condition estimation unit 7a can be replaced by the permanent-magnet magnetic flux estimation value Φmag, by preliminarily obtaining the correlation.

Figure 11:
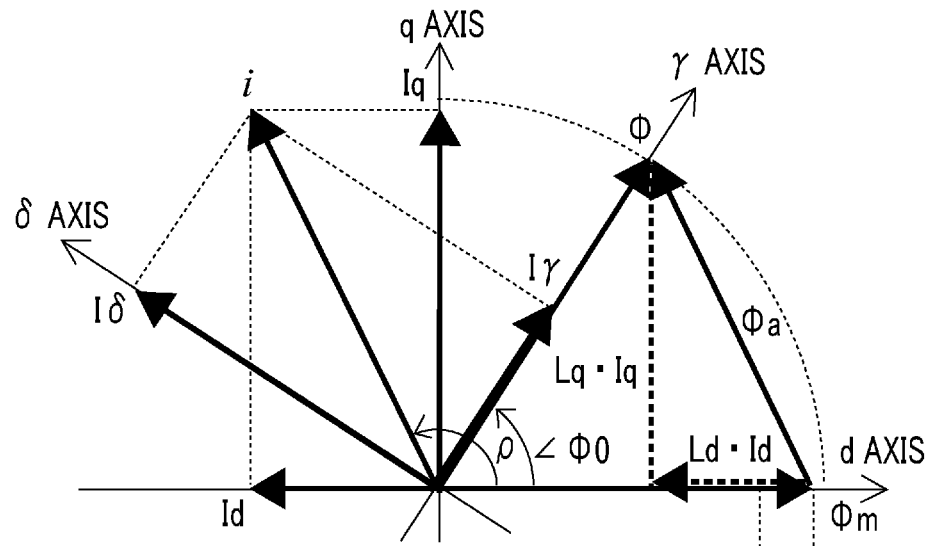
FIG. 11 is a set of explanatory charts representing the difference between a vector chart at the reference condition and a vector chart at a time when demagnetization is caused under given conditions of the total armature-interlinked magnetic flux command Φ* and the δ-axis current command Iδ*, in a vector chart of a synchronous machine having a magnetic-field permanent magnet.
Figure 11:
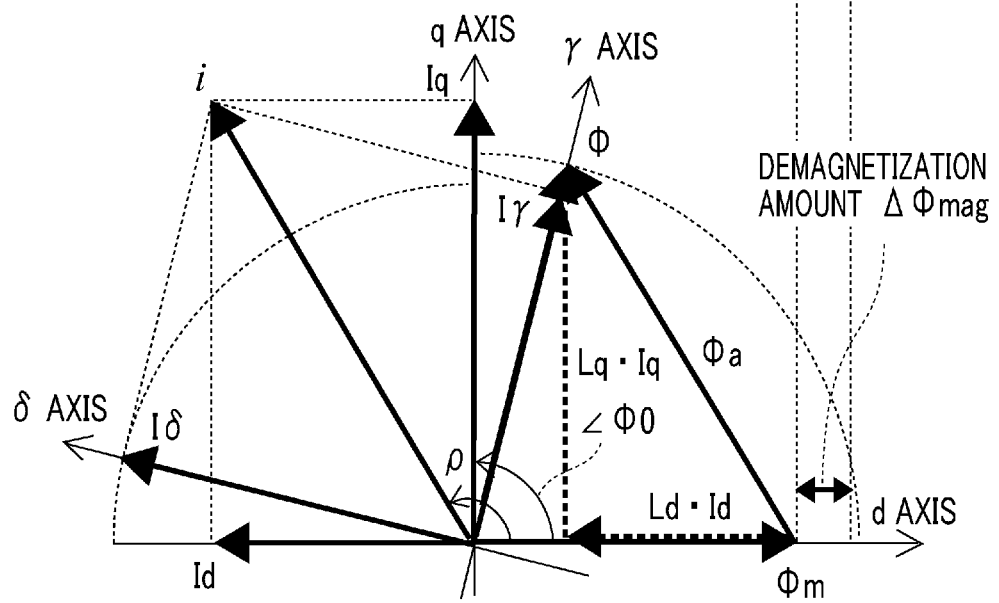

Here, by use of a vector chart of the synchronous machine, there will be explained the principle in which when as predetermined control commands, the total armature-interlinked magnetic flux command Φ* and the δ-axis current command Iδ* are given, the permanent-magnet temperature Tmag is estimated based on the γ-axis current Iγ. FIG. 11 is a set of explanatory charts representing the difference between a vector chart at the reference condition and a vector chart at a time when demagnetization is caused under given conditions of the total armature-interlinked magnetic flux command Φ* and the δ-axis current command Iδ*, in a vector chart of a synchronous machine having a magnetic-field permanent magnet. In FIG. 11, FIG. 11(A) is a vector chart at a time when the permanent magnet is in the reference condition, i.e., no demagnetization is caused in the permanent magnet; FIG. 6(B) is a vector chart at a time when the magnetic flux decreases by an amount corresponding to demagnetization of the permanent magnet, caused due to a temperature rise in the synchronous machine 1, i.e., by ΔΦmag, when the permanent magnet is in a steady state where the magnitude |Φ| of total armature-interlinked magnetic flux and the δ-axis current Iδ are constant under an assumption that the total armature-interlinked magnetic flux command Φ* and the δ-axis current command Iδ*, which are predetermined control commands, are constant, i.e., desirably controlled.

The foregoing demagnetization of the permanent magnet changes the direction of the total armature-interlinked magnetic flux Φ, i.e., the direction of the γ-axis; therefore, there occurs a change between the pre-demagnetization γ-axis current Iγ and the post-demagnetization γ-axis current Iγ, even when the total armature-interlinked magnetic flux command Φ* and the δ-axis current command Iδ* are kept constant; thus, by grasping the change in the γ-axis current Iγ, a change in the permanent-magnet magnetic flux Φmag, i.e., a change in the permanent-magnet temperature Tmag can also be grasped.

In the foregoing synchronous machine control apparatus according to Embodiment 2 of the present invention, as is the case with Embodiment 1, it is not required to mount a temperature detector directly on the permanent magnet, and the permanent-magnet temperature (or magnetic flux) of the synchronous machine 1 is estimated based on not voltage information but the γ-axis current Iγ; therefore, the voltage-output accuracy, for example, a voltage error caused by the dead time of the inverter, of the electric-power conversion unit 2 hardly provides an adverse effect, whereby there is demonstrated an effect that the temperature or the magnetic flux of the permanent magnet can accurately be estimated. When there exists at least one kind of map data, these values can be estimated; thus, there is demonstrated an effect that the permanent-magnet temperature or magnetic flux can be estimated with less map data.

Embodiment 3

Figure 12:
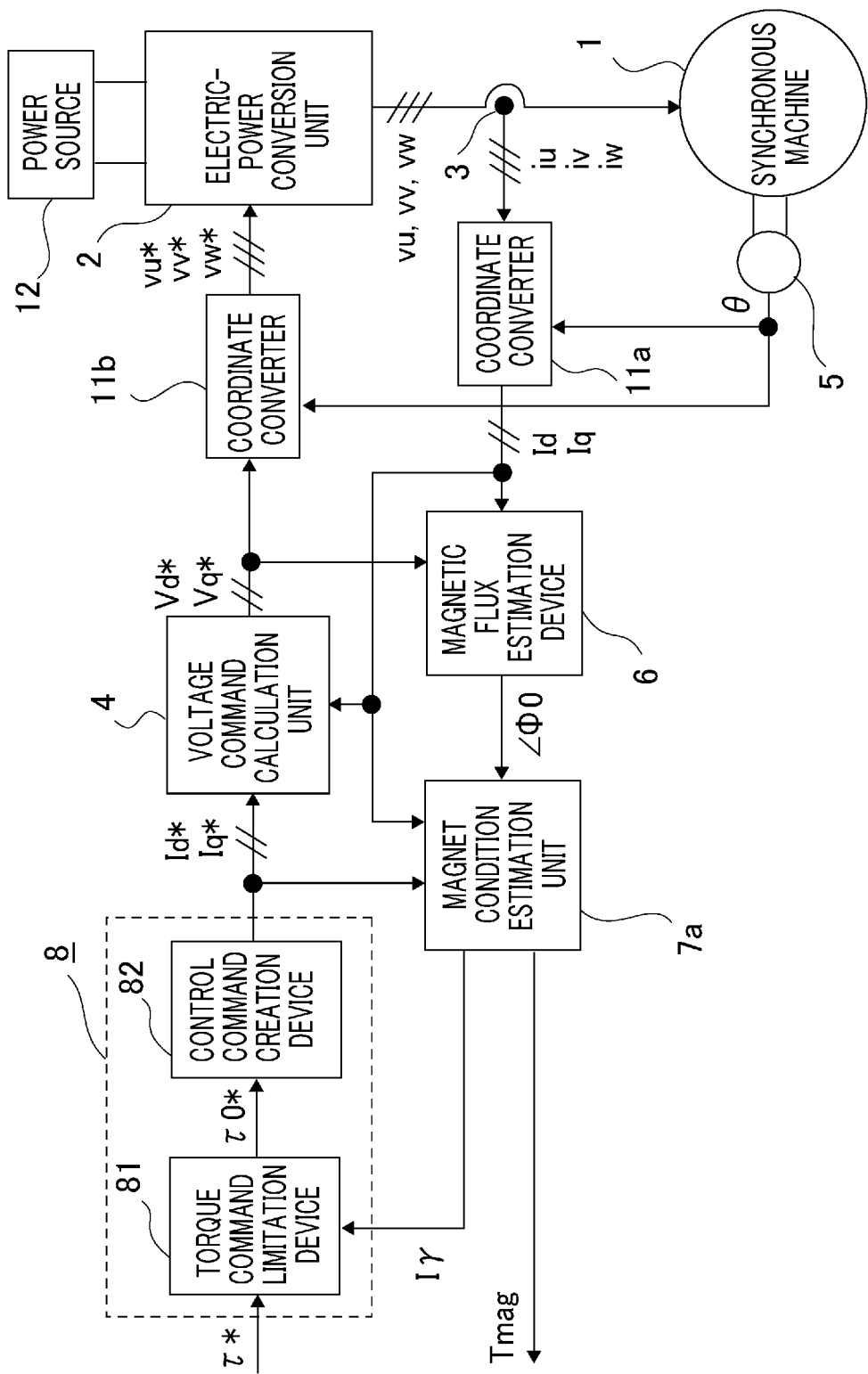
FIG. 12 is a system configuration diagram illustrating a synchronous machine control apparatus according to Embodiment 3 of the present invention, along with a synchronous machine.
Figure 13:
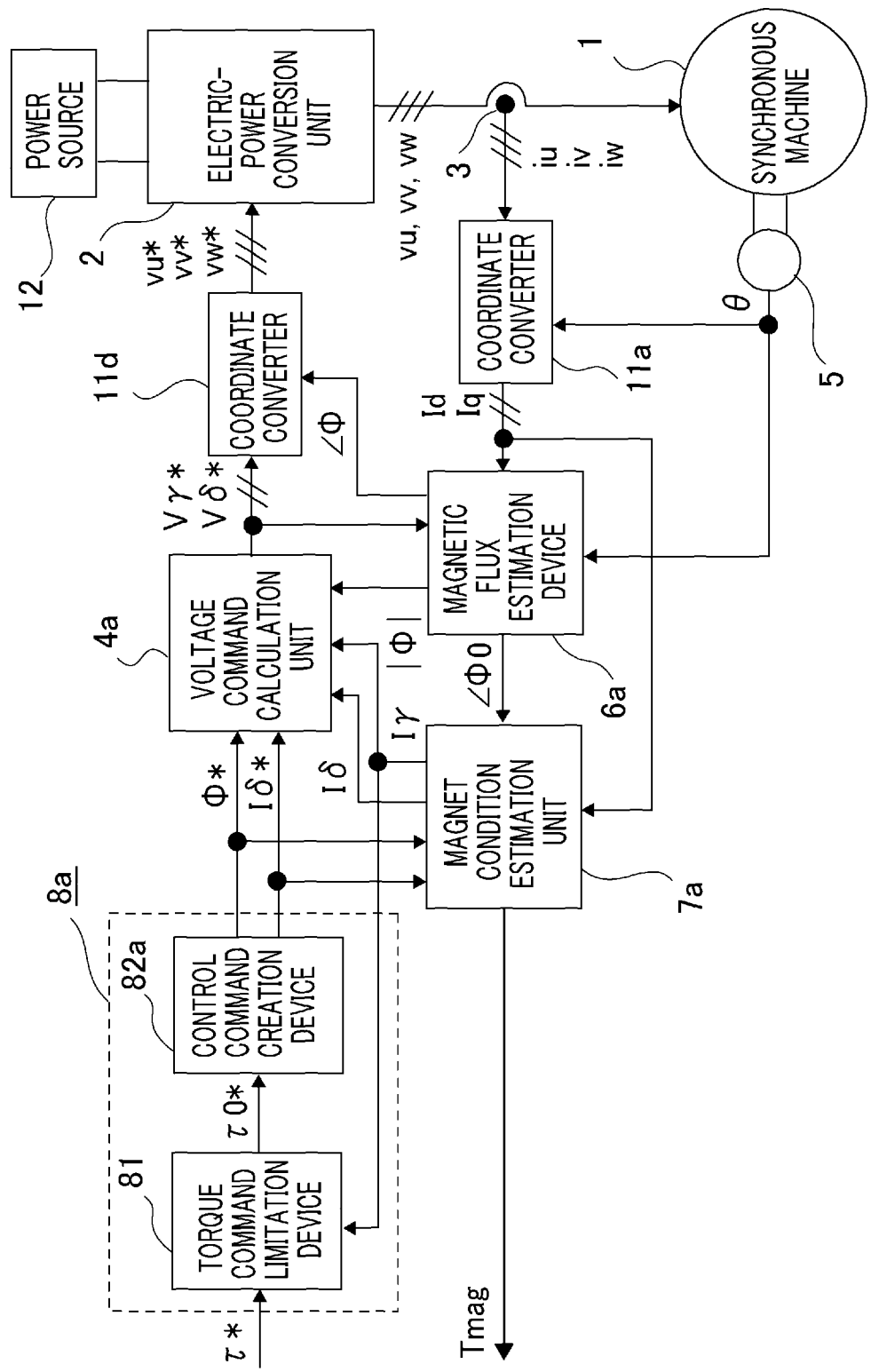
FIG. 13 is a system configuration diagram illustrating a variant example of synchronous machine control apparatus according to Embodiment 3 of the present invention, along with a synchronous machine.

Next, there will be explained a synchronous machine control apparatus according to Embodiment 3 of the present invention. FIG. 12 is a system configuration diagram illustrating a synchronous machine control apparatus according to Embodiment 3 of the present invention, along with a synchronous machine; FIG. 13 is a system configuration diagram illustrating a variant example of synchronous machine control apparatus according to Embodiment 3 of the present invention, along with a synchronous machine. As illustrated in each of FIGS. 12 and 13, in a synchronous machine control apparatus according to Embodiment 3 of the present invention, there is added a control command calculation unit 8 (or 8a), which is a higher-hierarchy command creation system for creating the control commands based on the torque command so that the torque command is limited in accordance with the γ-axis current Iγ and the control commands are outputted in accordance with the limited torque command.

In FIG. 12, the control command calculation unit 8 generates the d-q axis current command Id* and Iq*, as the control commands explained in Embodiment 1; in contrast, in FIG. 13, the control command calculation unit 8a generates the total armature-interlinked magnetic flux command Φ* and the δ-axis current command Iδ*, as the control commands explained in Embodiment 2. As illustrated in FIGS. 12 and 13, the control command calculation unit 8 (8a) is configured with a torque command limitation device 81 and a control command creation device 82 (82a). The configurations of the torque command limitation devices 81 in FIGS. 12 and 13 are the same as each other. Hereinafter, the torque command to be limited by the torque command limitation device 81 and the (limited) torque command, the output of the torque command limitation device 81, are distinguished from each other, by letting τ* denote the former and letting τ0* denote the latter.

As described above, the γ-axis current Iγ corresponds to the magnetization current for operating the total armature-interlinked magnetic flux of the synchronous machine 1; when due to a temperature rise in the synchronous machine 1, demagnetization (decrease in the magnetic flux, corresponding to ΔΦmag) of the permanent magnet is caused, an increase in the γ-axis current Iγ compensates the magnetic flux corresponding to the demagnetization (there exists an exception in the case where as the control commands, the d-q axis current commands Id* and Iq* are given).

Accordingly, as the γ-axis current Iγ increases, the armature current (effective value) of the synchronous machine 1 also increases; thus, due to the heat (such as the heat produced in the resistance of the armature winding) produced in the synchronous machine 1, the temperature of the overall synchronous machine 1 including the permanent magnet also increases, whereby demagnetization of the permanent magnet is facilitated. Furthermore, when the allowable temperature is exceeded, irreversible demagnetization may be caused in which even when the temperature falls down to the normal temperature, the magnetic flux does not return to the state at a time before the demagnetization is caused. There exists an upper limit value of the armature current, of the synchronous machine 1, that is limited by the performance (e.g., the device rating of the switching device, which is a constituent element of the electric-power conversion unit 2) of the electric-power conversion unit 2; it is possible that due to the increase in the γ-axis current Iγ, the upper limit value is exceeded.

Accordingly, when the temperature of the synchronous machine 1 rises, in order to suppress the temperature from further increasing and the armature current of the synchronous machine 1 from exceeding the upper limit value, the torque command τ* is limited in accordance with the γ-axis current Iγ so that the magnitudes of the control commands (the d-q axis current commands Id* and Iq*, or the total armature-interlinked magnetic flux command Φ* and the δ-axis current command Iδ*) are indirectly reduced and hence the armature current (effective value) is suppressed from increasing.

The torque command limitation device 81 limits the torque command τ* in accordance with the γ-axis current Iγ and outputs the (limited) torque command τ0*. The correlation between the γ-axis current Iγ and the torque command τ* is set in accordance with the driving condition, the heat capacity of the synchronous machine 1 or cooling performance thereof, and the performance of the electric-power conversion unit 2. For example, when with predetermined control commands, the γ-axis current Iγ exceeds a given value, it is determined that the permanent-magnet temperature has approximated to a temperature leading to irreversible demagnetization, and then, the torque command is decreased; extremely speaking, for example, processing of decreasing the torque command to "0" is implemented and the (limited) torque command τ0* is outputted. It may be allowed that as the γ-axis current Iγ increases, the limitation value of the torque command τ* is reduced stepwise.

In the mode illustrated in FIG. 13, in which the total armature-interlinked magnetic flux command Φ* and the δ-axis current command Iδ* are provided, there exists a value of the γ-axis current command Iγ* outputted from the magnetization current creation device 41; thus, instead of the γ-axis current Iγ, Iγ* may be utilized.

Based on the (limited) torque command τ0*, the control command creation device 82 in FIG. 12 creates the d-q axis current commands Id* and Iq*, which are control commands.

In the case of the synchronous machine 1 having a magnetic-field permanent magnet, it is known that there exist numerous combinations, of the d-axis currents Id and the q-axis current Iq, that can produce a single and the same torque; for the (limited) torque command τ0*, appropriate d-q axis current commands Id* and Iq* conforming to the desired conditions (e.g., the maximum efficiency, the maximum torque, and the like) are outputted.

The methods of selecting the d-q axis current commands Id* and Iq* include a well-known method of making the efficiency of a motor maximum, a method of making the power factor of a motor "1", a method of making the torque obtained for a given interlinked magnetic flux maximum, a method of making the torque obtained for a given motor current maximum, and the like. In the synchronous machine control apparatus according to Embodiment 3 of the present invention, an arbitrary method may be utilized in selecting the d-q axis current commands Id* and Iq*, based on the torque command τ0*, and hence the detail of the method of selecting these current commands Id* and Iq* will be omitted; however, as the most simple method, for example, there exists a method in which the negative d-axis current command value Id* is adjusted in such a way that the d-q axis voltage commands Vd* and Vq* outputted from the voltage command calculation unit 4 do not exceed the maximum voltage that the electric-power conversion unit 2 can apply to the synchronous machine 1, and then the q-axis current command Iq* is created based on the equation (17).

The permanent-magnet magnetic flux Φm in the equation (17) below changes as the temperature changes; thus, at a time when drive is started, the permanent-magnet magnetic flux Φm is set to a predetermined value such as a reference value and then is recursively and sequentially updated with a permanent-magnet magnetic flux estimation value Φmag that can be obtained by performing the magnet temperature (magnetic flux) estimation.

$$Iq^* = \frac{\tau 0^*}{Pm \cdot \{\Phi m + (Ld - Lq) \cdot Id^*\}} \quad (17)$$

where Pm is the number of pole pairs in the synchronous machine 1.

As a method other than the foregoing ones, there may be utilized a method in which the optimal values of the d-q axis currents Id and Iq corresponding to various kinds of torques of the synchronous machines 1 are preliminarily measured and mapped and then the map is referred to during the operation, as may be necessary, in accordance with the (limited) torque command τ0* so that the d-q axis current commands Id* and Iq* corresponding to τ0* are obtained.

In FIG. 13 illustrating a variant example of the synchronous machine control apparatus according to Embodiment 3, based on the (limited) torque command τ0*, the control command creation device 82a creates the total armature-interlinked magnetic flux command Φ* and the δ-axis current command Iδ*, which are control commands. As is the case where as control commands, the d-q axis current commands Id* and Iq* are created, in the case of the synchronous machine 1 having a magnetic-field permanent magnet, it is known that there exist numerous combinations, of the total armature-interlinked magnetic flux Φ and the δ-axis current Iδ, that can produce a single and the same torque; for the (limited) torque command τ0*, the control command creation device 82a outputs the total armature-interlinked magnetic flux command Φ* and δ-axis current command Iδ*, which are appropriate control commands conforming to the desired conditions (e.g., the maximum efficiency, the maximum torque, and the like).

Figure 14:
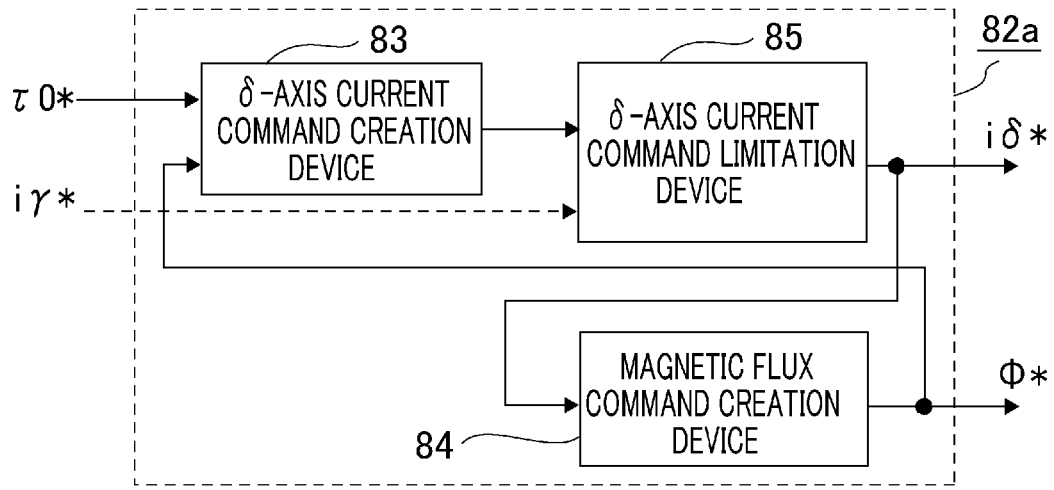
FIG. 14 is a configuration diagram illustrating an example of control command creation apparatus in FIG. 13.

FIG. 14 is a diagram illustrating an example of the control command creation apparatus in FIG. 13. In FIG. 14, the control command creation device 82a is configured with a δ-axis current command creation device 83 and a magnetic flux command creation device 84; in order to make the control command creation device 82a more suitable, there is added a δ-axis current command limitation device 85 that limits the δ-axis current command Iδ* by use of γ-axis current command Iγ* (indicated by the dotted-line arrow in FIG. 14) calculated by the voltage command calculation unit 4a.

Based on the (limited) torque command τ0* and the total armature-interlinked magnetic flux command Φ* outputted from the magnetic flux command creation device 84, the δ-axis current command creation device 83 calculates the δ-axis current command Iδ*, through the equation (18) below.

$$I\delta^* = \frac{\tau 0^*}{Pm \cdot \Phi^*} \quad (18)$$

In the case where the magnetic-flux error ΔΦ is adjusted to be zero in the magnetization current command creation device 41 in the voltage command calculation unit 4a illustrated in FIG. 8, the absolute value |Φ| of the total armature-interlinked magnetic flux obtained through the equation (10) below may be utilized, instead of the total armature-interlinked magnetic flux command Φ*, in the calculation according to the equation (18).

$$I\delta^* = \frac{\tau 0^*}{Pm \cdot |\Phi|} \quad (19)$$

in the case where the δ-axis current command limitation device 85 is added, the δ-axis current command Iδ* is limited based on a current limitation value Imax, which is determined based on the specification or the like of the electric-power conversion unit 2, and the γ-axis current command Iγ* in such a way that the synthetic electric current of the δ-axis current command Iδ* and the γ-axis current command Iγ* is limited to the current limitation value Imax. The upper limit value Iδ*max of the δ-axis current command Iδ* is obtained through the equation (20) below; while Iδ*max is sequentially obtained, the δ-axis current command Iδ* is limited in such a way that the absolute value of the δ-axis current command Iδ* becomes the same as or smaller than Iδ*max.

$$I\delta^* max = \sqrt{(Imax)^2 - (I\gamma^*)^2} \quad (20)$$

In response to the inputted δ-axis current command Iδ*, the magnetic flux command creation device 84 outputs an optimum total armature-interlinked magnetic flux command Φ*, for example, the total armature-interlinked magnetic flux command Φ* with which the maximum torque is outputted under a condition that the armature current (effective value) of the synchronous machine 1 is constant.

When under the foregoing conditions, the synchronous machine 1 is driven, the copper loss caused in the lead wire between the armature winding of the synchronous machine 1 and the electric-power conversion unit 2 becomes smaller, and the conduction loss caused in the electric-power conversion unit 2 also becomes smaller; therefore, the conversion efficiencies of the synchronous machine 1 and the electric-power conversion unit 2 are raised.

Figure 15:
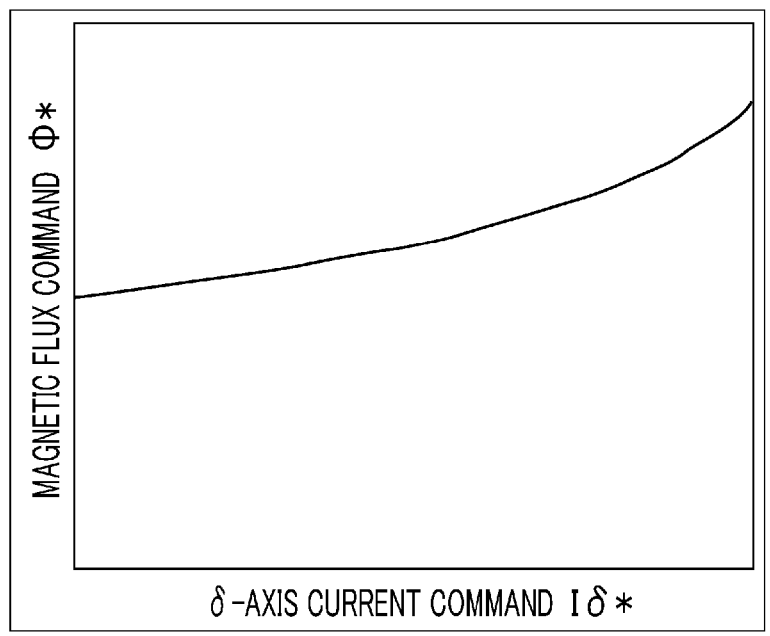
FIG. 15 is a conceptual chart for explaining the relationship between the δ-axis current command Iδ* and the magnetic flux command Φ* in the magnetic flux command creation device in FIG. 14.

FIG. 15 is a conceptual chart for explaining the relationship between the δ-axis current command Iδ* and the magnetic flux command Φ* in the magnetic flux command creation device in FIG. 14, and represents an example of the relationship between the δ-axis current command Iδ* and the total armature-interlinked magnetic flux command Φ*, which satisfies the foregoing conditions; the relationship is preliminarily stored, as an equation or table data, in the magnetic flux command creation device 84, and then an optimum total armature-interlinked magnetic flux Φ* is outputted in response to the inputted δ-axis current command Iδ*.

As another optimum total armature-interlinked magnetic flux command Φ*, although not illustrated in FIG. 14, there exists a total armature-interlinked magnetic flux command Φ* for which in addition to the δ-axis current command Iδ*, the rotation speed ω of the synchronous machine 1 is referred to, and with which the iron loss, including the eddy current loss and the hysteresis loss in the synchronous machine 1, that depends on the speed can be reduced for the δ-axis current command Iδ*. When the synchronous machine 1 is driven under these conditions, there is reduced the iron loss, caused in the synchronous machine 1, that becomes conspicuous when the rotation speed thereof is high; thus, mainly in the zone of high rotation speed, the conversion efficiency of the synchronous machine 1 is raised.

In the case where in the control command creation device 82a illustrated in FIG. 14, the δ-axis current command limitation device 85 is added and the δ-axis current command Iδ* is limited through the equation (20), the calculation performed from the δ-axis current command creation device 83 to the magnetic flux command creation device 84 becomes circular. That is to say, there is established a loop "the (limited) torque command τ0*→(the δ-axis current command creation device 83, the δ-axis current command limitation device 85)→the δ-axis current command Iδ*→(the magnetic flux command creation device 84)→the total armature-interlinked magnetic flux command Φ*→(the δ-axis current command creation device 83)→the δ-axis current command Iδ*'''; thus, in order to determine the δ-axis current command Iδ* and the total armature-interlinked magnetic flux command Φ* for the inputted torque command τ0*, it is required to recurrently carry out and converge the calculation performed from the δ-axis current command creation device 83 to the magnetic flux command creation device 84, whereby it becomes difficult to perform the calculation processing.

Accordingly, when in an actual apparatus, the foregoing processing is performed by a microcomputer with a predetermined calculation cycle, it may be required to take measures such as raising the stability of the calculation processing, for example, in such a way that as the total armature-interlinked magnetic flux command Φ* to be utilized by the δ-axis current command creation device 83, the immediately previous (one calculation cycle before) calculation result is utilized, and the present total armature-interlinked magnetic flux command Φ* is calculated based on the δ-axis current command Iδ* calculated by use of the command value, or in such a way that the magnetic flux command creation device 84 outputs the value of the total armature-interlinked magnetic flux command Φ* through an appropriate filter.

Figure 16:
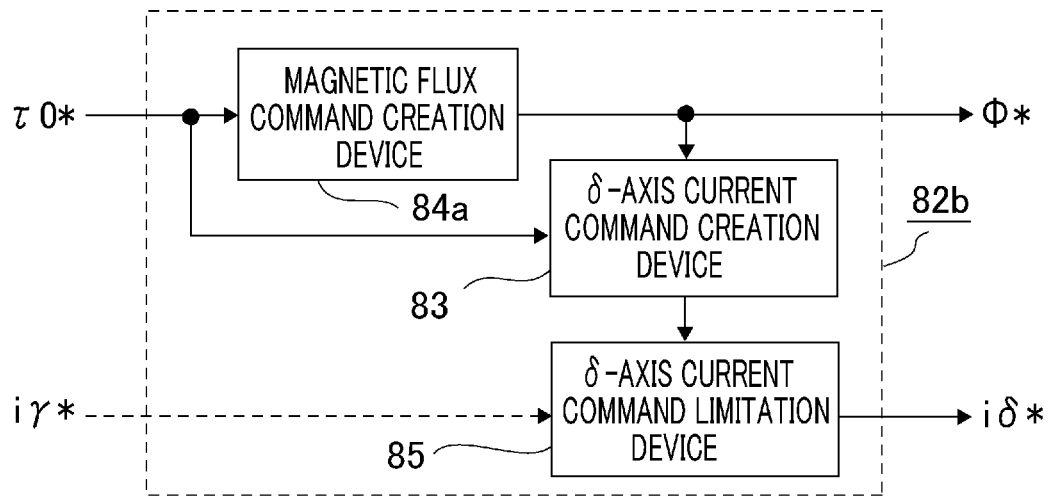
FIG. 16 is a block diagram illustrating another configuration example of control command creation apparatus in FIG. 13.

In FIG. 13, instead of the control command creation device 82a illustrated in FIG. 14, a control command creation device 82b, described later, may be utilized. FIG. 16 is a block diagram illustrating another configuration example of the control command creation device in FIG. 13. In FIG. 16, the control command creation device 82b is configured in such a way as to create the total armature-interlinked magnetic flux command Φ* based not on the δ-axis current command Iδ* but on the (limited) torque command τ0*.

A magnetic flux command creation device 84a in FIG. 16 outputs an optimum total armature-interlinked magnetic flux command Φ* in response to the inputted (limited) torque command τ0*. For example, by converting the abscissa of the graph in FIG. 15 into the torque command by use of the equation (21) below, the total armature-interlinked magnetic flux command Φ* for the inputted (limited) torque command τ0* can be obtained.

$$\tau 0^* = Pm \cdot \Phi^* \cdot I\delta^* \quad (21)$$

Figure 17:
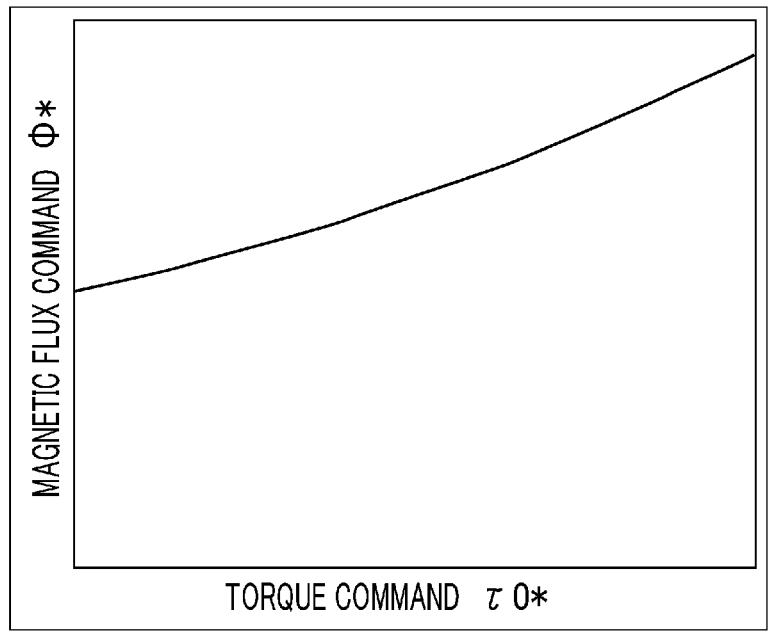
FIG. 17 is a conceptual chart for explaining the relationship between the torque command τ0* and the magnetic flux command Φ* in the magnetic flux command creation device in FIG. 16.

FIG. 17 is a conceptual chart for explaining the relationship between the torque command τ0* and the magnetic flux command Φ* in the magnetic flux command creation device in FIG. 16, and represents an example of the relationship, between the (limited) torque command τ0* and the total armature-interlinked magnetic flux command Φ*, that is obtained based on FIG. 15. The magnetic flux command creation device 84b preliminarily stores the relationship, as an equation or table data, in the magnetic flux command creation device 84a and then outputs an optimum total armature-interlinked magnetic flux Φ* in accordance with the inputted torque command τ0*. The operations of the δ-axis current command creation device 83 and the δ-axis current command limitation device 85 in the control command creation device 82b are the same as those in the control command creation device 82a.

Furthermore, in order to optimize the control command creation devices 82a and 82b, it is only necessary to create the total armature-interlinked magnetic flux command Φ*, for which the voltage limitation value has been taken into consideration, that is limited by the specification of the electric-power conversion unit 2.

In the electric-power conversion unit 2, there exists an output-capable voltage maximum value Vmax (converted into an effective value) that depends on the specification of the electric-power conversion unit 2 and the output voltage Vpn of the power source 12; it is desirable that the total armature-interlinked magnetic flux command Φ* is limited in such a way that the induction voltage generated in the armature of the synchronous machine 1 is suppressed to be the same as or lower than Vmax. The induction voltage is determined by the multiplication product of the rotation speed ω of the synchronous machine 1 and the total armature-interlinked magnetic flux Φ, when the voltage drop across the resistance R of the synchronous machine 1 is neglected; thus, it is more appropriate that based on the output-capable voltage maximum value Vmax of the electric-power conversion unit 2, the magnetic-flux maximum value Φmax corresponding to the rotation speed ω of the synchronous machine 1 is sequentially calculated through the equation (22) below and the value obtained by limiting the output of the magnetic flux command creation device 84 (84a) with Φmax is adopted as the total armature-interlinked magnetic flux command Φ*.

$$\Phi\max = \frac{V\max - R \cdot I\delta^* - \Delta V}{\omega} \cong \frac{V\max - \Delta V}{\omega} \quad (22)$$

$$V\max = \frac{Vpn}{\sqrt{2}}$$

ΔV = control marginal voltage

In the synchronous machine control apparatus according to Embodiment 3 of the present invention, as is the case where when the temperature of the synchronous machine 1 having a magnetic-field permanent magnet rises, the torque command is limited so that the temperature is suppressed from further rising, the increase in the armature current (effective value) is limited; therefore, there is demonstrated an effect that the irreversible demagnetization can be prevented and the armature current, of the synchronous machine 1, that is limited by the performance of the electric-power conversion unit 2 can be suppressed to be the same as or smaller than the limitation value.

Embodiment 4

Next, there will be explained a synchronous machine control apparatus according to Embodiment 4 of the present invention. In a synchronous machine control apparatus according to Embodiment 4 of the present invention, the magnet temperature estimation device 71, illustrated in FIG. 4, in the synchronous machine control apparatus according to Embodiment 1 is replaced by a magnet temperature estimation device 71b, described later, and the magnet temperature estimation device 71a, illustrated in FIG. 9, in the synchronous machine control apparatus according to embodiment 2 is replaced by a magnet temperature estimation device 71c, described later.

Figure 18:
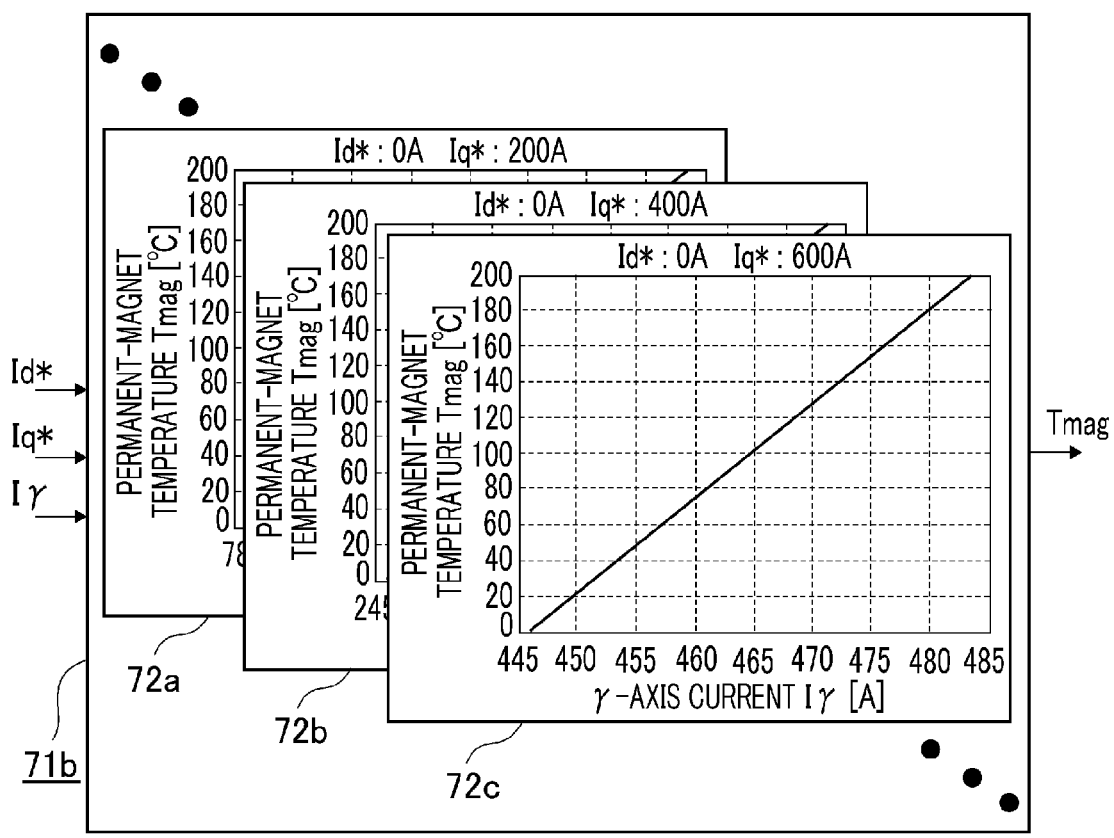
FIG. 18 is a set of configuration charts representing an example of the configuration of a magnet temperature estimation device in a synchronous machine control apparatus according to Embodiment 4 of the present invention.
Figure 19:
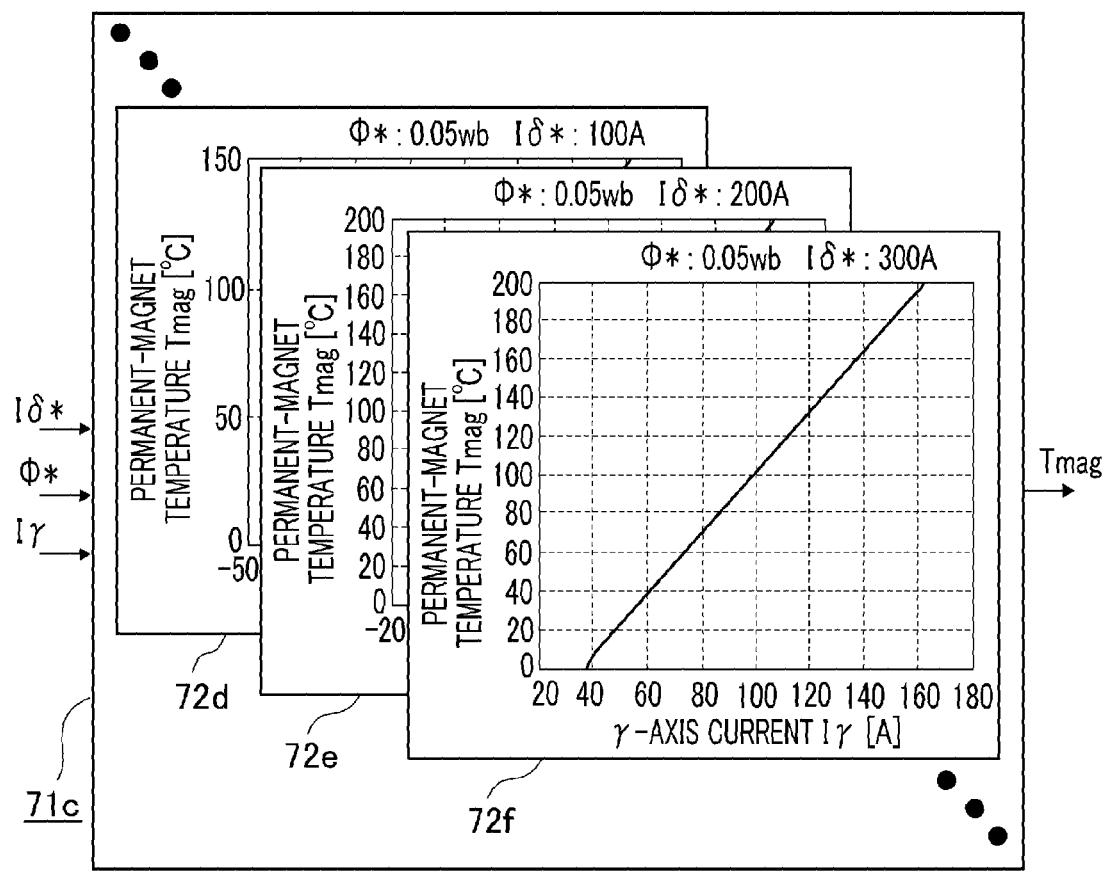
FIG. 19 is a set of configuration charts representing another example of magnet temperature estimation device in a synchronous machine control apparatus according to Embodiment 4 of the present invention.

FIG. 18 is a set of configuration charts representing an example of the configuration of a magnet temperature estimation device in a synchronous machine control apparatus according to Embodiment 4 of the present invention; FIG. 18 represents the configuration of the magnet temperature estimation device 71b at a time when as the control commands explained in Embodiment 1, the d-q axis current commands Id* and Iq* are given. FIG. 19 is a set of configuration charts representing another example of the configuration of a magnet temperature estimation device in a synchronous machine control apparatus according to Embodiment 4 of the present invention; FIG. 19 represents the magnet temperature estimation device 71c at a time when as the control commands explained in Embodiment 2, the δ-axis current command Iδ* and the total armature-interlinked magnetic flux command Φ* are given.

The synchronous machine control apparatus according to Embodiment 4 of the present invention is characterized by including, in both the magnet temperature estimation device 71b in FIG. 18 and the magnet temperature estimation device 71c in FIG. 19, magnetic condition reference units (charts 72a to 72c in FIG. 18 and charts 72d to 72f in FIG. 19) having a map or an equation indicating the correlation between the γ-δ axis current and the permanent-magnet temperature (magnetic flux) for each of a plurality of combinations of control commands, i.e., d-q axis current commands Id* and Iq* or a plurality of combinations of the δ-axis current command Iδ* and the total armature-interlinked magnetic flux command Φ*.

A synchronous machine control apparatus according to Embodiment 4 of the present invention will be explained with reference to the magnet temperature estimation device 71c in FIG. 18. For example, a plurality of combinations ((Id*, Iq*)=(Id1, Iq1), (Id2, Iq2), (Id3, Iq3), (Id4, Iq4) . . . ) of the d-q axis current commands Id* and Iq* are preliminarily set, and for each of the command combinations, there are prepared a plurality of magnetic condition reference units 72 in which a map or an equation indicating the relationship between the γ-axis current Iγ (or the δ-axis current Iδ) and the permanent-magnet temperature (estimation value) Tmag, which is caused by a temperature rise, are stored. In the example represented in FIG. 18, the magnetic condition reference unit 72a relates to (Id*, Iq*)=(0 [A], 200 [A]); the magnetic condition reference unit 72b relates to (Id*, Iq*)=(0 [A], 400 [A]); the magnetic condition reference unit 72c relates to (Id*, Iq*)=(0 [A], 600 [A]). For each of other control command conditions, two or more similar magnetic condition reference units are prepared.

As described above, the foregoing map or equation is preliminarily obtained by use of characteristic data on the synchronous machine 1, when the characteristics (such as an inductance change and a magnetic demagnetization characteristic) of the synchronous machine 1 are known through an analysis or the like; when not known, it is only necessary to obtain the characteristic data through an actual measurement.

When the d-q axis current commands Id* and Iq* at a time when the synchronous machine 1 is being driven approximately coincide with the preliminarily prepared control command conditions in each of a plurality of magnetic condition reference units 72 (in determining of the coincidence, some margin is given), the magnet temperature estimation device 71b outputs the permanent-magnet temperature estimation value Tmag by referring to the map or the equation of the magnetic condition reference unit 72 in which the control command conditions include the γ-axis current Iγ or the δ-axis current Iδ.

Nest, a synchronous machine control apparatus according to Embodiment 4 of the present invention will be explained with reference to the magnet temperature estimation device 71c in FIG. 19. For example, a plurality of combinations ((Iδ*, Φ*)=(Iδ1, Φ1), (Iδ2, Φ2), (Iδ3, Φ3), (Iδ4, Φ4) . . . ) of the δ-axis current command Iδ* and the total armature-interlinked magnetic flux command Φ* are preliminarily set, and for each of the command combinations, there are prepared a plurality of magnetic condition reference units 72 in which a map or an equation indicating the relationship between the γ-axis current Iγ and the permanent-magnet temperature (estimation value) Tmag, which is caused by a temperature rise, are stored. In the example represented in FIG. 19, the magnetic condition reference unit 72d relates to (Iδ*, Φ*)=(0.05 [Wb], 100 [A]); the magnetic condition reference unit 72e relates to (Iδ*, Φ*)=(0.05 [Wb], 200 [A]); the magnetic condition reference unit 72f relates to (Iδ*, Φ*)=(0.05 [Wb], 300 [A]). For each of other control command conditions, two or more similar magnetic condition reference units are prepared.

When the control command (Iδ*, Φ*) at a time when the synchronous machine 1 is being driven approximately coincide with the preliminarily prepared control command conditions in each of a plurality of magnetic condition reference units 72, the magnet temperature estimation device 71c outputs the permanent-magnet temperature estimation value Tmag by referring to the map or the equation in the magnetic condition reference unit 72 in which the control command conditions include the γ-axis current Iγ or the δ-axis current Iδ.

In the case where control commands at a time when the synchronous machine 1 is being driven do not coincide with the preliminarily prepared control command conditions in each of a plurality of magnetic condition reference units 72, it is only necessary to perform processing in which, for example, the permanent-magnet temperature estimation operation is not implemented, and the temperature estimation value of the immediately previous temperature estimation operation is held and outputted, as the permanent-magnet temperature estimation value Tmag. In the case where such processing is performed, the permanent-magnet temperature estimation operation is implemented intermittently.

In addition, as described above, there exists a correlation between the permanent-magnet temperature estimation value Tmag and the permanent-magnet magnetic flux estimation value Φmag; therefore, it goes without saying that based on the correlation, the permanent-magnet magnetic flux estimation value Φmag can be estimated. In this regard, however, in the case where the magnetic condition reference units 72 for each of a plurality of control commands are prepared, the probability that the control commands at a time when the synchronous machine 1 is being driven coincide with the preliminarily prepared control command conditions in the magnetic condition reference units 72 rises in proportion to the number of the magnetic condition reference units; thus, although it becomes possible to frequently estimate the permanent-magnet temperature (magnetic flux) even when the control command changes, the effect of the present invention, i.e., that estimation can be performed with fewer map data pieces may be reduces.

Therefore, appropriate setting is required for the purpose of preventing the number of control command conditions from extremely increasing when the magnetic condition reference units 72 are prepared. It has already been described that when the armature current (effective value) of the synchronous machine 1 increases, the temperature of the overall synchronous machine 1 including the permanent magnet also increases, due to the heat (such as the heat produced in the resistance of the armature winding) produced in the synchronous machine 1, whereby demagnetization of the permanent magnet is facilitated; in other words, it is conceivable that as far as the armature current (effective value) of the synchronous machine 1 is small, the temperature rise in the synchronous machine 1 is small and hence the demagnetization of the permanent magnet is not facilitated, i.e., the necessity of estimating the permanent-magnet temperature (magnetic flux) is small.

Figure 20:
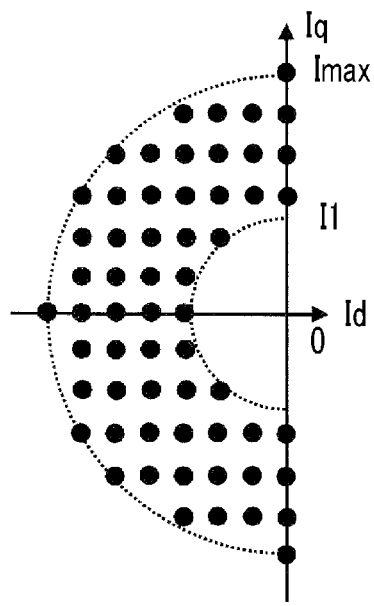
FIG. 20 is an explanatory chart representing an example in which there is shown a control command condition for providing a map or an equation representing the correlation between the γ-δ axis current and the permanent magnet temperature (magnetic flux) in a magnetic condition reference unit of a synchronous machine control apparatus according to Embodiment 4 of the present invention.

Thus, the control command condition for providing a map or an equation representing the correlation between the $\gamma$-$\delta$ axis current and the permanent magnet temperature (magnetic flux) in the magnetic condition reference unit 72 may be defined with a predetermined current value or larger. FIG. 20 is an explanatory chart representing an example in which there is shown a control command condition for providing a map or an equation representing the correlation between the $\gamma$-$\delta$ axis current and the permanent magnet temperature (magnetic flux) in a magnetic condition reference unit of a synchronous machine control apparatus according to Embodiment 4 of the present invention.

In FIG. 20, the outer dotted-line circle represents the current limitation value Imax, and the inner dotted-line circle represents the minimum current condition I1 for estimating the permanent-magnet temperature (magnetic flux); the black-circle marks arranged in the area surrounded by the two circles are control command conditions for providing a map or an equation indicating the correlation between the $\gamma$-$\delta$ axis current and the permanent-magnet temperature (magnetic flux) in the magnetic condition reference unit 72. A positive d-axis current is not frequently applied to the synchronous machine 1 having a magnetic-field permanent magnet; therefore, in order to reduce the map data, the black-circle marks are provided only in the area where the d-axis current is negative.

FIG. 20 is nothing but an example; therefore, it is not necessarily required that as represented in FIG. 20, the conditions represented by the foregoing black-circle marks are spaced equally from one another; in the case where when the synchronous machine 1 is driven, only specific control commands are provided, it is only necessary to set the foregoing black-circle marks in accordance with the control commands.

There has been described an example in which in the case where the control commands at a time when the synchronous machine 1 is being driven do not coincide with the preliminarily prepared control command conditions in the magnetic condition reference units 72, the permanent-magnet temperature estimation operation is not performed, i.e., the permanent-magnet temperature estimation operation is performed intermittently; however, in this case, the permanent-magnet temperature estimation operation may not be performed for a long time when the synchronous machine 1 is being driven. Taking this concern into consideration, it may be allowed that the control commands at a time when the synchronous machine 1 is being driven are forced to coincide, every predetermined period, with preliminarily prepared control command conditions in the magnetic condition reference units 72 so that the permanent-magnet temperature estimation operation is performed without fail in steps of predetermined period.

In such a manner as described above, there can be prevented the situation in which the permanent-magnet temperature estimation operation is not performed for a long time when the synchronous machine 1 is being driven. In this regard, however, when the control commands at a time when the synchronous machine 1 is being driven are forced to coincide, every predetermine period, with the preliminarily prepared control command conditions in the magnetic condition reference units 72, it is required to suppress a change in the torque output of the synchronous machine 1.

As described above, in the case of the synchronous machine 1 having a magnetic-field permanent magnet, by utilizing the fact that there exist numerous combinations, of the d-axis currents Id and the q-axis current Iq or numerous combinations of the total armature-interlinked magnetic flux $\Phi$ and the $\delta$-axis current I$\delta$, that can produce a single and the same torque, there is performed processing of selecting a combination of control commands with which the torque at a time when the control commands have not been altered and the torque at a time when the control commands have been altered do not largely differ from each other and which coincide with the control command conditions in the magnetic condition reference units 72, so that the torque output of the synchronous machine 1 is suppressed from changing.

The synchronous machine control apparatus according to Embodiment 4 of the present invention is characterized by being insusceptible to the effect of the voltage output accuracy (e.g., a voltage error caused by the dead time of the inverter) of the electric-power conversion unit 2, compared to a conventional technology, because the permanent-magnet temperature (magnetic flux) is directly estimated by use of the $\gamma$-$\delta$ axis currents I$\gamma$ and I$\delta$, instead of voltage information. However, when the d-axis component $\Phi$d and the q-axis component $\Phi$q of the total armature-interlinked magnetic flux $\Phi$ are estimated by use of the d-q axis voltage commands Vd* and Vq* and then the magnitude |$\Phi$| and the phase $\angle\Phi$ of the total armature-interlinked magnetic flux $\Phi$ are obtained based on the equations (10) and (11), voltage information is utilized; therefore, in the low-speed zone where the voltage becomes low, the synchronous machine control apparatus slightly undergoes the voltage output accuracy of the electric-power conversion unit 2. Accordingly, in the low-speed zone, the foregoing effect is provided to the accuracy in estimating the total armature-interlinked magnetic flux and the accuracy in coordinate-converting the armature current, which undergoes the estimation accuracy, into the currents on the $\gamma$ axis and the $\delta$ axis; thus, the voltage output accuracy may provide an effect to the accuracy in estimating the permanent-magnet temperature (magnetic flux).

In the case of an application where the synchronous machine 1 is accelerated by its own torque, in the operation in which energization is started when the speed is zero and then the torque is produced, the speed, in many cases, passes through a speed zone where the voltage accuracy is likely to provide an effect before the demagnetization caused by an temperature increase provides an effect; it is conceivable that in this kind of application, the necessity of estimating the permanent-magnet temperature (magnetic flux) in the low-speed zone is small.

Figure 21:
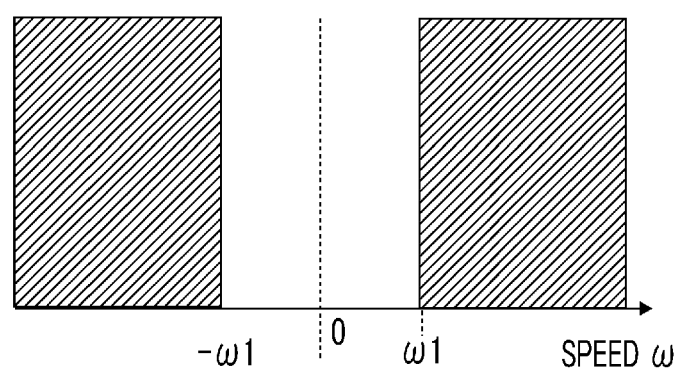
FIG. 21 is an explanatory chart representing a speed zone for estimating the permanent magnet temperature (magnetic flux) in a synchronous machine control apparatus according to Embodiment 4 of the present invention.

Thus, the permanent-magnet temperature (magnetic flux) estimation operation may be limited to be performed only when the rotation speed ω of the synchronous machine 1 is a predetermined speed or higher. FIG. 21 is an explanatory chart representing a speed zone for estimating the permanent magnet temperature (magnetic flux) in a synchronous machine control apparatus according to Embodiment 4 of the present invention; in the zone (in the range from −ω1 to ω1, when the negative speed is considered) where the rotation speed is a predetermined speed ω1 or lower and the voltage accuracy may provide an effect, the permanent-magnet temperature (magnetic flux) estimation operation is not performed even when the control commands at a time the synchronous machine is being driven coincide with the preliminarily prepared control command conditions in the magnetic condition reference units 72. In such a manner as described above, the permanent-magnet temperature (magnetic flux) estimation operation is performed only in the high-speed zone where the voltage output accuracy of the electric-power conversion unit is becomes higher; thus, there is demonstrated an effect that the estimation accuracy is raised.

In the foregoing synchronous machine control apparatus according to Embodiment 4 of the present invention, the magnetic condition reference units 72 for each of a plurality of control commands are prepared; therefore, because the probability that the control commands at a time when the synchronous machine 1 is being driven coincide with the preliminarily prepared control command conditions in the magnetic condition reference units 72 rises, there is demonstrated an effect that even when the control command sequentially changes, the change in the control command is followed and the permanent-magnet temperature (magnetic flux) can be estimated.

Moreover, there is demonstrated an effect that because the control command condition for providing a map or an equation indicating the correlation between the γ-δ axis currents and the permanent-magnet temperature (magnetic flux) is limited to a current zone where the estimation is required, the configuration of the magnetic condition reference unit can be simplified.

Furthermore, the control commands at a time when the synchronous machine 1 is being driven are forced to coincide, every predetermined period, with preliminarily prepared control command conditions in the magnetic condition reference units 72 so that the permanent-magnet temperature estimation operation is performed without fail in steps of a predetermined period; thus, there is demonstrated an effect that by performing the permanent-magnet temperature (magnetic flux) estimation every predetermined period, the estimation operation can be prevented from being not performed for a long time.

Still moreover, because the permanent-magnet temperature (magnetic flux) estimation operation is performed only in the high-speed zone where the voltage output accuracy of the electric-power conversion unit becomes higher, the temperature (magnetic flux) is estimated only when the accuracy in estimating the total armature-interlinked magnetic flux based on the voltage command is extremely high or only when the accuracy in coordinate-converting the armature current, which undergoes the foregoing estimation accuracy, into the γ-axis current and the δ-axis current is extremely high; thus, there is demonstrated an effect that the estimation accuracy is raised.

Embodiment 5

Next, there will be explained a synchronous machine control apparatus according to Embodiment 5 of the present invention. In a synchronous machine control apparatus according to Embodiment 5 of the present invention, in addition to the mode in which as described in Embodiments 1 through 4, the permanent-magnet temperature (magnetic flux) is estimated based on the control commands and the γ-δ axis currents, there is provided a mode in which the control commands are set in such a way that the armature current of the synchronous machine 1 becomes zero and then the permanent-magnet temperature (magnetic flux) is estimated based on the total armature-interlinked magnetic flux Φ, which has been estimated when the armature current has been set.

The method, described in Embodiments 1 through 4, of estimating the permanent-magnet temperature (magnetic flux) based on the γ-δ axis currents is a method under the assumption that some sort of current is flowing in the armature winding of the synchronous machine 1; therefore, when the armature current of the synchronous machine 1 is zero, the permanent-magnet temperature (magnetic flux) cannot be estimated. Accordingly, in order to estimate the permanent-magnet temperature (magnetic flux), it is required to apply an unnecessary current to the armature winding; thus, the flow of the unnecessary current may cause unnecessary torque or raise the temperature of the permanent magnet.

Taking the foregoing problems into consideration, in addition to the mode in which as described in Embodiments 1 through 4, the permanent-magnet temperature (magnetic flux) is estimated based on the γ-δ axis currents, there is added a mode in which the control commands are set in such a way that the armature current of the synchronous machine 1 becomes zero and then the permanent-magnet temperature (magnetic flux) is estimated based on the total armature-interlinked magnetic flux Φ, which has been estimated when the armature current has been set, so that the permanent-magnet temperature (magnetic flux) can be estimated when energization is not implemented, without applying any unnecessary current to the armature winding.

Figure 22:
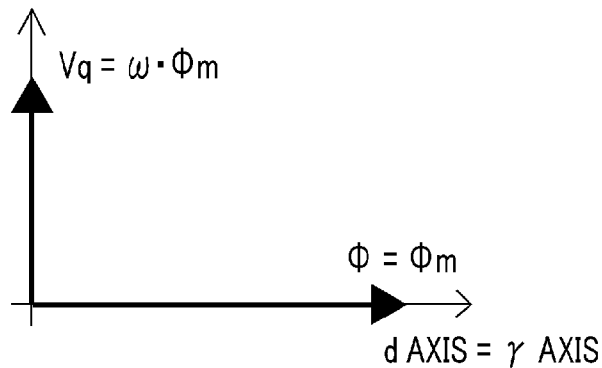
FIG. 22 is a vector chart at a time when a synchronous machine having a magnetic-field permanent magnet is not energized, in a synchronous machine control apparatus according to Embodiment 5 of the present invention.

FIG. 22 is a vector chart at a time when a synchronous machine having a magnetic-field permanent magnet is not energized, in a synchronous machine control apparatus according to Embodiment 5 of the present invention. When the synchronous machine is not energized, only the permanent-magnet magnetic flux Φm forms magnetic flux included in the armature-interlinked magnetic flux; therefore, the total armature-interlinked magnetic flux Φ and the permanent-magnet magnetic flux Φm coincide with each other. In addition, only the induction voltage caused by the permanent-magnet magnetic flux Φm generates the voltage across the synchronous machine 1; therefore, the d-q axis voltages Vd and Vq at a time when the synchronous machine is not energized are obtained through the equation (23) below.

$$Vd=0 \quad Vq=\omega \cdot \Phi = \omega \cdot \Phi m \qquad (23)$$

When the foregoing control commands are set in such a way that the armature current of the synchronous machine 1 becomes zero, i.e., when as the control commands, the d-q axis current commands Id* and Iq* are set to be zero, adjustment is performed in such a way that the d-q axis voltages Vd and Vq and the d-q axis voltage commands Vd* and Vq* coincide with each other; thus, based on the equation (24) below, the total armature-interlinked magnetic flux Φ (the value thereof is the permanent-magnet magnetic flux estimation value Φmag) is obtained from the q-axis voltage command Vq*.

$$\Phi mag = \Phi = \frac{Vq^*}{\omega} \quad (24)$$

It goes without saying that it is made possible to convert (mag into Tmag, based on the equation (9) that represents the relationship between the permanent-magnet temperature estimation value Tmag and the permanent-magnet magnetic flux estimation value Φmag.

In the case where as the control commands, the total armature-interlinked magnetic flux command Φ* and the δ-axis current command Iδ* are provided, the armature current of the synchronous machine 1 is monitored by the current detection unit 3, while, for example, the total armature-interlinked magnetic flux command Φ* is set to a predetermined permanent-magnet magnetic flux value such as a reference value and the δ-axis current command Iδ* is set to zero; the total armature-interlinked magnetic flux command Φ* is adjusted in such a way that the armature current becomes zero; then, the total armature-interlinked magnetic flux command Φ* at a time when the armature current is zero and no energization is performed corresponds to the permanent-magnet magnetic flux estimation value Φmag. In this case, although the armature current may flow in the process of adjusting the total armature-interlinked magnetic flux command Φ*, no unnecessary current flows in the armature winding during the estimation of the permanent-magnet magnetic flux.

The configuration of Embodiment 5 can be added to any one of Embodiments 1 through 4.

The foregoing synchronous machine control apparatus according to Embodiment 5 of the present invention can demonstrate an effect that the permanent-magnet temperature (magnetic flux) can be estimated even during the non-energization period in which the γ-δ axis currents are not generated.

Embodiment 6

Next, a synchronous machine control apparatus according to Embodiment 6 of the present invention will be explained. In a synchronous machine control apparatus according to Embodiment 6 of the present invention, in each of Embodiments 2 and 3, the δ-axis current command Iδ* is set to "0", i.e., [Iδ*=0] is provided for the purpose of controlling the δ-axis current to be zero so that the synchronous machine is unloaded, and there is provided the total armature-interlinked magnetic flux command Φ* with which the induction voltage generated in the armature of the synchronous machine 1 becomes the same as or lower than the output-capable voltage of the electric-power conversion unit 2.

In this case, based on the equation (22), the total armature-interlinked magnetic flux command Φ* needs to be set in such a way as to fall within the range represented by the equation (25) below.

$$\Phi^* \leq \Phi max = \frac{V max - R \cdot I\delta^* - \Delta V}{\omega} \cong \frac{V max - \Delta V}{\omega} \quad (25)$$

In order to provide these control commands, it may be allowed that as illustrated in FIG. 7 of Embodiment 2, there are directly given the δ-axis current command Iδ* and the total armature-interlinked magnetic flux command Φ* that satisfy the foregoing equation, or [Iδ*=0] is obtained through a calculation based on the equation (18) by setting the torque command τ* in FIG. 13 of Embodiment 3 to "0" (in practice, τ0*=0), and then the magnetic flux command creation device 84 provides Φ* that satisfies the equation (25).

Figure 23:
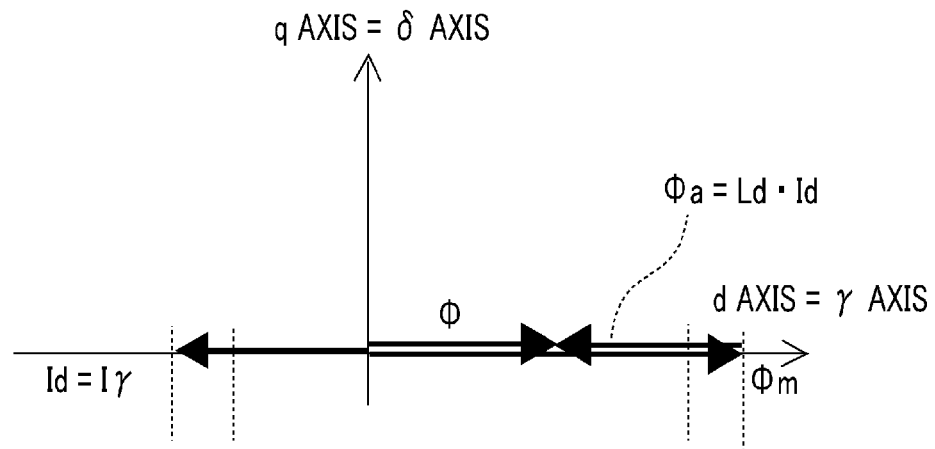
FIG. 23 is a set of vector charts at a time when the δ-axis current is controlled to be zero, in a synchronous machine control apparatus according to Embodiment 6 of the present invention.
Figure 23:
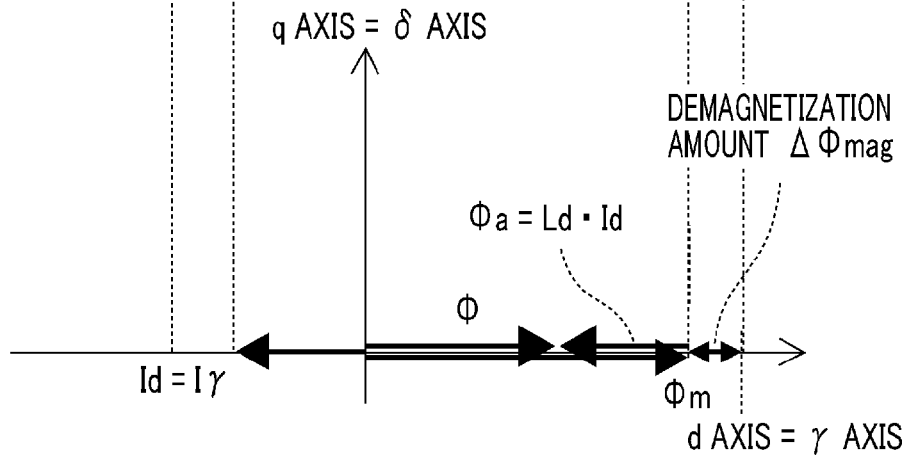

FIG. 23 is a set of vector charts at a time when the δ-axis current is controlled to be zero, in a synchronous machine control apparatus according to Embodiment 6 of the present invention; FIG. 23 is a set of explanatory charts representing the difference between a vector chart at the reference condition and a vector chart at a time when demagnetization is caused under given conditions of the total armature-interlinked magnetic flux command Φ* and the δ-axis current command Iδ*(Φ*≤Φmax, Iδ*=0). FIG. 23(A) is a vector chart at a time when the permanent magnet is in the reference (unloaded) condition, i.e., no demagnetization is caused in the permanent magnet; FIG. 23(B) is a vector chart at a time when the magnetic flux decreases by an amount corresponding to demagnetization of the permanent magnet, caused due to a temperature rise in the synchronous machine 1, i.e., by ΔΦmag, when the permanent magnet is in a steady state where the magnitude |Φ| of total armature-interlinked magnetic flux and the δ-axis current Iδ are constant under an assumption that the total armature-interlinked magnetic flux command Φ*(≤Φmax) and the δ-axis current command Iδ* (=0), which are predetermined control commands, are constant, i.e., desirably controlled.

In FIG. 23, the δ-axis current Iδ does not flow and only the γ-axis current Iγ flows; thus, all the vectors of the permanent-magnet magnetic flux Φm, the armature reaction magnetic flux Φa produced by the γ-axis current Iγ, and the total armature-interlinked magnetic flux Φ lie on a single and the same axis; the γ axis becomes equal to the d axis, and the δ axis becomes equal to the q axis. That is to say, Φa=Lγ·Iγ=Ld·Id. FIG. 23 represents an example where the armature reaction magnetic flux Φa is exerted to weaken the permanent-magnet magnetic flux Φm; in this case, when the demagnetization of the permanent magnet is caused, the armature reaction magnetic flux Φa, which is exerted to weaken the permanent-magnet magnetic flux Φm, is reduced by the decrease ΔΦmag in the permanent-magnet magnetic flux, as long as the total armature-interlinked magnetic flux Φ is controlled to be a predetermined constant value; as a result, when a change in the γ-axis inductance Lγ hardly provides an effect, the (absolute value of) γ-axis current Iγ also becomes small.

In contrast, when the armature reaction magnetic flux Φa is exerted to strengthen the permanent-magnet magnetic flux Φm, the decrease ΔΦmag in the permanent-magnet magnetic flux is compensated with an increase in the armature reaction magnetic flux Φa; as a result, the (absolute value of) γ-axis current |Iγ| becomes large. As describe above, in both cases, there is caused a change between the pre-demagnetization magnitude of the γ-axis current Iγ and the post-demagnetization magnitude of the γ-axis current Iγ; thus, by apprehending the change in the γ-axis current Iγ, a change in the permanent-magnet magnetic flux Φmag, i.e., a change in the permanent-magnet temperature Tmag can also be apprehended.

In the case where based on a change in the γ-axis current Iγ, a change in the permanent-magnet magnetic flux Φm or the permanent-magnet temperature estimation value Tmag is obtained, a method the same as those describe in foregoing embodiments may be performed.

In Embodiment 6, because the δ-axis current Iδ is not made to flow and only the γ-axis current Iγ for estimating the permanent-magnet temperature (magnetic flux) is made to flow, the permanent-magnet temperature (magnetic flux) can be estimated without making more current than is needed flow in the armature winding.

It is true that there exists the foregoing restriction "Φ*≤Φmax", but when the total armature-interlinked magnetic flux command Φ* is set to the value of the permanent-magnet magnetic flux at a time when due to heating, demagnetization is caused (e.g., at 100° C.), the total armature-interlinked magnetic flux command Φ* and the permanent-magnet magnetic flux Φmag approximately coincide with each other at around 100° C. and hence the armature reaction magnetic flux Φa is hardly produced; thus, the γ-axis current Iγ hardly flows.

Accordingly, the permanent-magnet temperature (magnetic flux) can be estimated without making more current than is needed flow in the armature winding; therefore, the heating or loss caused by the γ-axis current Iγ can also be suppressed. In the case where the permanent-magnet temperature is as low as a room temperature, when the total armature-interlinked magnetic flux command Φ* is set to the value of the permanent-magnet magnetic flux at a time when the temperature is 100° C., the γ-axis current Iγ for producing the armature reaction magnetic flux Φa that weaken the permanent-magnet magnetic flux Φm flows; however, because the δ-axis current Iδ does not flow, the armature current does not become excessively large and the permanent-magnet temperature is low, heating caused by the γ-axis current Iγ does not provide a large effect, either.

In Embodiment 6, [Iδ*=0] is provided; therefore, while the permanent-magnet temperature (magnetic flux) is estimated, the no torque is produced in the synchronous machine 1. Accordingly, in order to perform the estimation while the synchronous machine 1 drives its loads, i.e., while the torque is produced, it is only necessary to issue commands, just for a short time, to establish the condition that Iδ*=0 (or τ*=0) and Φ*≤Φmax so as to suppress as much as possible the produced torque of the synchronous machine 1 from providing an effect when it becomes zero.

Figure 24:
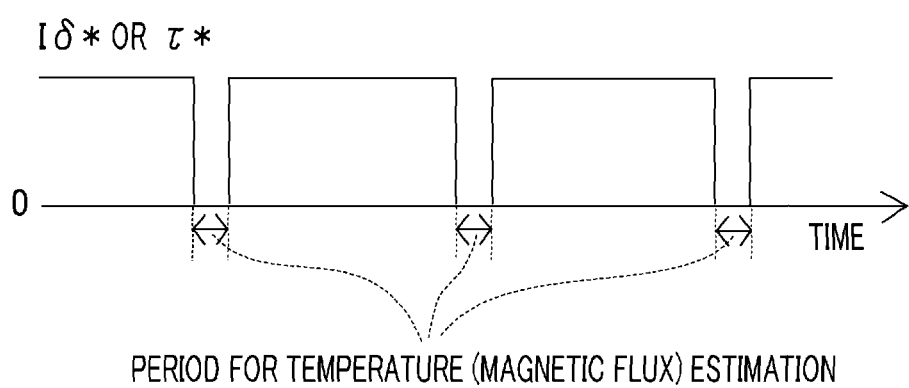
FIG. 24 is a timing chart representing an example of operation timing for estimating the δ-axis current command Iδ* or the torque command τ* and the permanent magnet temperature or the magnetic flux in a synchronous machine control apparatus according to Embodiment 6 of the present invention.

FIG. 24 is a timing chart representing an example of operation timing for estimating the δ-axis current command Iδ* or the torque command τ* and the permanent magnet temperature or the magnetic flux in a synchronous machine control apparatus according to Embodiment 6 of the present invention. As represented in FIG. 24, while the synchronous machine 1 drives its loads (while the torque is produced), the δ-axis current command Iδ* or the torque command τ* is intermittently made to be zero and then the permanent-magnet temperature (magnetic flux) is estimated during the period. In such a manner as described above, even when the synchronous machine 1 drives its loads, the produced torque of the synchronous machine 1 is suppressed as much as possible from providing an effect when it becomes zero, and the permanent-magnet temperature (magnetic flux) can be estimated without making more current than is needed flow in the armature winding; therefore, the heating or loss caused by the armature current can be suppressed during the estimation operation.

The foregoing synchronous machine control apparatus according to Embodiment 6 of the present invention can demonstrate an effect that the permanent-magnet temperature (magnetic flux) can be estimated without making more current than is needed flow in the armature winding and the heating or loss caused by the armature current can be suppressed. While the synchronous machine 1 drives its loads (while the torque is produced), the δ-axis current command Iδ* or the torque command τ* is intermittently made to be zero and then the permanent-magnet temperature (magnetic flux) is estimated during the period; therefore, there is demonstrated an effect that even when the synchronous machine 1 drives its loads, the produced torque of the synchronous machine 1 is suppressed as much as possible from providing an effect when it becomes zero, and the heating or loss caused by the armature current related to the estimation operation can be suppressed.

Synchronous machine control apparatuses according to the present invention, described heretofore, are characterized as follows:

(1) There are provided an electric-power conversion unit that outputs a voltage to a synchronous machine having a permanent magnet for forming a magnetic field, based on a voltage command; a current detection unit that detects an armature current of the synchronous machine; a voltage command calculation unit that calculates the voltage command, based on a control command; a position detection unit that estimates or detects a rotor position of the synchronous machine; a magnetic flux estimation device that estimates a γ axis in which a total armature-interlinked magnetic flux of the synchronous machine is generated, based on at least one of the armature current and the voltage command; and a magnet condition estimation unit that estimates the temperature or the magnetic flux of the permanent magnet. A synchronous machine control apparatus according to the present invention is characterized in that the magnet condition estimation unit coordinate-converts the armature current into currents on the γ-δ axis consisting of the γ axis and the δ axis that is perpendicular to the γ axis, based on the rotor position and the estimated γ axis, and estimates the temperature or the magnetic flux of the permanent magnet, based on the control command and the γ-δ axis currents.

The synchronous machine control apparatus, configured in such a manner, according to the present invention makes it possible to estimate with less map data a high-accuracy permanent-magnet temperature or magnetic flux that is insusceptible to the voltage output accuracy of the electric-power conversion unit, without mounting a temperature detection device directly on the permanent magnet.

(2) A synchronous machine control apparatus according to the present invention is characterized in that the control commands are on the d-q axis that is a rotating biaxial coordinate system of the synchronous machine (Embodiment 1, FIGS. 1 through 6).

The synchronous machine control apparatus, configured in such a manner, according to the present invention makes it possible to estimate with less map data a high-accuracy permanent-magnet temperature or magnetic flux that is insusceptible to the voltage output accuracy of the electric-power conversion unit, without mounting a temperature detection device directly on the permanent magnet.

(3) A synchronous machine control apparatus according to the present invention is characterized in that the control commands are a δ-axis current command for controlling the δ-axis current to be a predetermined value and a total armature-interlinked magnetic flux command for controlling the total armature-interlinked magnetic flux to be a predetermined value (Embodiment 2, FIGS. 7 through 11).

The synchronous machine control apparatus, configured in such a manner, according to the present invention makes it possible to estimate with less map data a high-accuracy permanent-magnet temperature or magnetic flux that is insusceptible to the voltage output accuracy of the electric-power conversion unit, without mounting a temperature detection device directly on the permanent magnet.

(4) A synchronous machine control apparatus according to the present invention is characterized by including a control command calculation unit that limits a torque command for the synchronous machine in accordance with the γ-axis current and outputs the control command in accordance with the limited torque command (Embodiment 3, FIGS. 12 through 17).

In the synchronous machine control apparatus, configured in such a manner, according to the present invention, the torque command is limited when the temperature of the synchronous machine including the permanent magnet rises; thus, there is demonstrated an effect that the irreversible demagnetization can be prevented and the armature current, of the synchronous machine, that is limited by the performance of the electric-power conversion unit can be suppressed to be the same as or smaller than the limitation value.

(5) A synchronous machine control apparatus according to the present invention is characterized in that the magnet condition estimation unit includes a magnetic condition reference unit that has a map or an equation indicating the correlation between the γ-δ axis currents and the permanent-magnet temperature or magnetic flux for a plurality of the control commands (Embodiment 4, FIGS. 18 and 19).

The synchronous machine control apparatus, configured in such a manner, according to the present invention makes it possible to keep track of a change in the control command and estimate the permanent-magnet temperature or magnetic flux, even when the control command sequentially changes.

(6) A synchronous machine control apparatus according to the present invention is characterized in that the control command condition for providing the map or the equation indicating the correlation between the γ-δ axis currents and the permanent-magnet temperature or magnetic flux is set at a time when the armature current is a predetermined value or larger (Embodiment 4, FIG. 20).

In the synchronous machine control apparatus, configured in such a manner, according to the present invention, because the control command condition for providing a map or an equation indicating the correlation between the γ-δ axis currents and the permanent-magnet temperature (magnetic flux) is limited to a current zone where the estimation is required, the configuration of the magnetic condition reference unit can be simplified.

(7) A synchronous machine control apparatus according to the present invention is characterized in that the control command is set, every predetermined period, to a control command for which the correlation between the γ-δ axis currents and the permanent-magnet temperature or magnetic flux is indicated in the magnetic condition reference unit and in that the magnet condition estimation unit estimates the permanent-magnet temperature or magnetic flux, based on the set control command (Embodiment 4).

In the synchronous machine control apparatus, configured in such a manner, according to the present invention, by performing the permanent-magnet temperature (magnetic flux) estimation every predetermined period, the estimation operation can be prevented from being not performed for a long time.

(8) A synchronous machine control apparatus according to the present invention is characterized in that the control command is set, every predetermined period, to a control command for which the correlation between the γ-δ axis currents and the permanent-magnet temperature or magnetic flux is indicated in the magnetic condition reference unit and in that the magnet condition estimation unit performs the operation of estimating the permanent-magnet temperature or magnetic flux, only when the speed, of the synchronous machine, that is obtained by converting the rotor position is a predetermined speed or higher (Embodiment 4, FIG. 21).

In the synchronous machine control apparatus, configured in such a manner, according to the present invention, because the operation of estimating the permanent-magnet temperature (magnetic flux) is performed only in a high-speed zone where the voltage output accuracy of the electric-power conversion unit becomes higher, the permanent-magnet temperature (magnetic flux) is estimated only when the accuracy in estimating the total armature-interlinked magnetic flux based on the voltage command is extremely high or only when the accuracy in coordinate-converting the armature current, which undergoes the foregoing estimation accuracy, into the γ-axis current and the δ-axis current is extremely high; thus, there is demonstrated an effect that the estimation accuracy is raised.

(9) A synchronous machine control apparatus according to the present invention is characterized in that the magnet condition estimation unit includes a mode in which the permanent-magnet temperature or magnetic flux is estimated based on the control commands and the γ-δ axis currents and a mode in which the control commands are set in such a way that the armature current of the synchronous machine becomes zero and then the permanent-magnet temperature or magnetic flux is estimated based on the total armature-interlinked magnetic flux, which has been estimated when the armature current has been set (Embodiment 5, FIG. 22).

In the synchronous machine control apparatus, configured in such a manner, according to the present invention, there is demonstrated an effect that even when no energization is performed, the permanent-magnet temperature (magnetic flux) can be estimated.

(10) A synchronous machine control apparatus according to the present invention is characterized in that the control commands are a δ-axis current command for controlling the δ-axis current to be zero and a total armature-interlinked magnetic flux command for controlling the total armature-interlinked magnetic flux in such a way that an induction voltage generated in the synchronous machine becomes the same as or lower than the output-capable voltage of the electric-power conversion unit (Embodiment 6, FIG. 23).

The synchronous machine control apparatus, configured in such a manner, according to the present invention can demonstrate an effect that the permanent-magnet temperature (magnetic flux) can be estimated without making more current than is needed flow in the armature winding and the heating or loss caused by the armature current can be suppressed.

(11) A synchronous machine control apparatus according to the present invention is characterized in that the δ-axis current command or the torque command for the synchronous machine is intermittently made to be zero, and the magnet condition estimation unit performs the operation of estimating the permanent-magnet temperature or magnetic flux only when the δ-axis current command or the torque command for the synchronous machine is zero (Embodiment 6, FIG. 24).

In the synchronous machine control apparatus, configured in such a manner, according to the present invention, there is demonstrated an effect that even when the synchronous machine drives its loads, the produced torque of the synchronous machine is suppressed as much as possible from providing an effect when it becomes zero, and the heating or loss caused by the armature current related to the permanent-magnet temperature (magnetic flux) estimation can be suppressed.

Various modifications and alterations of this invention will be apparent to those skilled in the art without departing from the scope and spirit of this invention, and it should be understood that this is not limited to the illustrative embodiments set forth herein.

What is claimed is:

1. A synchronous machine control apparatus comprising:
    an electric-power conversion unit that outputs a voltage to a synchronous machine having a permanent magnet for forming a magnetic field, based on a voltage command;
    a current detection unit that detects an armature current of the synchronous machine;
    a voltage command calculation unit that calculates the voltage command, based on a control command;
    a position detection unit that estimates or detects a rotor position of the synchronous machine;
    a magnetic flux estimation device that estimates a $\gamma$ axis in which a total armature-interlinked magnetic flux of the synchronous machine is generated, based on at least one of the armature current and the voltage command; and
    a magnet condition estimation unit that estimates a temperature and a magnetic flux of the permanent magnet, wherein the magnet condition estimation unit coordinate-converts the armature current into currents on a $\gamma$-$\delta$ axis consisting of the $\gamma$ axis and a $\delta$ axis that is perpendicular to the $\gamma$ axis, based on the rotor position and the estimated $\gamma$ axis, and estimates the temperature and the magnetic flux of the permanent magnet, based on the control command and the $\gamma$-$\delta$ axis currents.

2. The synchronous machine control apparatus according to claim 1, wherein the control command is a current command on a d-q axis that is a rotating biaxial coordinate system of the synchronous machine.

3. The synchronous machine control apparatus according to claim 1, wherein the control command includes a $\delta$-axis current command for controlling the $\delta$-axis current to be a predetermined value and a total armature-interlinked magnetic flux command for controlling the total armature-interlinked magnetic flux to be a predetermined value.

4. The synchronous machine control apparatus according to claim 3, wherein the control commands are a $\delta$-axis current command for controlling the $\delta$-axis current to be zero and a total armature-interlinked magnetic flux command for controlling the total armature-interlinked magnetic flux in such a way that an induction voltage generated in the synchronous machine becomes the same as or lower than the output-capable voltage of the electric-power conversion unit.

5. The synchronous machine control apparatus according to claim 3, wherein the $\delta$-axis current command or the torque command for the synchronous machine is intermittently made to be zero, and the magnet condition estimation unit performs the operation of estimating the permanent-magnet temperature or magnetic flux only when the $\delta$-axis current command or the torque command for the synchronous machine is zero.

6. The synchronous machine control apparatus according to claim 1, further including a control command calculation unit that limits a torque command for the synchronous machine in accordance with the $\gamma$-axis current and outputs the control command in accordance with the limited torque command.

7. The synchronous machine control apparatus according to claim 1, wherein the magnet condition estimation unit includes a magnetic condition reference unit that has a map or an equation indicating the correlation between the $\gamma$-$\delta$ axis currents and the permanent-magnet temperature or magnetic flux for a plurality of the control commands.

8. The synchronous machine control apparatus according to claim 5, wherein the control command condition for providing the map or the equation indicating the correlation between the $\gamma$-$\delta$ axis currents and the permanent-magnet temperature or magnetic flux is set at a time when the armature current is a predetermined value or larger.

9. The synchronous machine control apparatus according to claim 7, wherein the control command is set, every predetermined period, to a control command for which the correlation between the $\gamma$-$\delta$ axis currents and the permanent-magnet temperature or magnetic flux is indicated in the magnetic condition reference unit; and the magnet condition estimation unit estimates the permanent-magnet temperature or magnetic flux, based on the set control command.

10. The synchronous machine control apparatus according to claim 9, wherein the control command is set, every predetermined period, to a control command for which the correlation between the $\gamma$-$\delta$ axis currents and the permanent-magnet temperature or magnetic flux is indicated in the magnetic condition reference unit; and the magnet condition estimation unit performs the operation of estimating the permanent-magnet temperature or magnetic flux, only when the speed, of the synchronous machine, that is obtained by converting the rotor position is a predetermined speed or higher.

11. The synchronous machine control apparatus according to claim 1, wherein the magnet condition estimation unit includes a mode in which the permanent-magnet temperature or magnetic flux is estimated based on the control commands and the $\gamma$-$\delta$ axis currents and a mode in which the control commands are set in such a way that the armature current of the synchronous machine becomes zero and then the permanent-magnet temperature or magnetic flux is estimated based on the total armature-interlinked magnetic flux that has been estimated when the armature current has been set.

* * * * *